US011126253B2

(12) United States Patent
Okamura

(10) Patent No.: US 11,126,253 B2
(45) Date of Patent: Sep. 21, 2021

(54) ELECTRONIC DEVICE AND CIRCUIT SUBSTRATE

(71) Applicant: SEIKO EPSON CORPORATION, Tokyo (JP)

(72) Inventor: Yukio Okamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 58 days.

(21) Appl. No.: 16/773,706

(22) Filed: Jan. 27, 2020

(65) Prior Publication Data

US 2020/0241626 A1 Jul. 30, 2020

(30) Foreign Application Priority Data

Jan. 30, 2019 (JP) .............................. JP2019-014174

(51) Int. Cl.
*G06F 1/32* (2019.01)
*G06F 1/3287* (2019.01)
*G06F 1/3234* (2019.01)

(52) U.S. Cl.
CPC .......... *G06F 1/3287* (2013.01); *G06F 1/3275* (2013.01); *G06F 1/3284* (2013.01)

(58) Field of Classification Search
CPC ..... G06F 1/3287; G06F 1/3275; G06F 1/3284
See application file for complete search history.

(56) References Cited

U.S. PATENT DOCUMENTS

| 2009/0177898 | A1* | 7/2009 | Huang | G06F 1/3293 |
| | | | | 713/300 |
| 2010/0083019 | A1* | 4/2010 | Aoki | G06F 1/3203 |
| | | | | 713/320 |
| 2010/0293403 | A1* | 11/2010 | Yamashita | H04N 1/00885 |
| | | | | 713/323 |
| 2016/0062775 | A1 | 3/2016 | Yoshihara | |
| 2018/0063349 | A1* | 3/2018 | Ohata | H04N 1/00888 |

FOREIGN PATENT DOCUMENTS

JP 2016-051925 4/2016

* cited by examiner

*Primary Examiner* — Stefan Stoynov
(74) *Attorney, Agent, or Firm* — Workman Nydegger

(57) ABSTRACT

An electronic device includes a main circuit including a processor, a sub circuit that transits between a first state and a second state, and a power supply circuit that supplies electric power to the main circuit and the sub circuit. An electrical distance between the main circuit and the power supply circuit is shorter than an electrical distance between the main circuit and the sub circuit. When the processor determines to cause the sub circuit to transit from the second state to the first state, the processor increases electric power supplied from the power supply circuit to the sub circuit. The sub circuit transits from the second state to the first state in response to increase of the electric power supplied from the power supply circuit.

20 Claims, 12 Drawing Sheets

ELECTRONIC DEVICE AND CIRCUIT SUBSTRATE

The present application is based on, and claims priority from JP Application Serial Number 2019-014174, filed Jan. 30, 2019, the disclosure of which is hereby incorporated by reference herein in its entirety.

BACKGROUND

1. Technical Field

The present disclosure relates to an electronic device and a circuit substrate.

2. Related Art

In recent years, a request to reduce power consumption of various electronic devices is strong, and a setting to put unused circuits and mechanisms into a power saving state is performed in many electronic devices. Many electronic devices have a main circuit and a sub circuit, and the main circuit controls supply of electric power to the sub circuit and mechanisms controlled by the sub circuit. Thereby, power saving is achieved.

As one of these electronic devices, for example, JP-A-2016-51925 describes an information processing apparatus including a power supply control unit, a main system, and a sub system. In the information processing apparatus described in JP-A-2016-51925, the main circuit described above is composed of the power supply control unit and the main system, and the sub circuit described above is composed of the sub system. A CPU of the main system detects a factor for shifting the sub system to a power saving state, develops a boot image in a DRAM of the sub system, and shifts the DRAM to a self-refresh state. Thereafter, the CPU informs the power supply control unit that the sub system shifts to the power saving state, and the power supply control unit stops supply of electric power from a power supply unit to the sub system and puts the sub system into the power saving state. The power supply control unit detects a return factor of the sub circuit from the power saving state, restarts the supply of electric power from the power supply unit to the sub system, and thereafter transmits a return signal having a value indicating the return from the power saving state to the sub system. The sub system recognizes that the sub system has returned from the power saving state based on the return signal, cancels the self-refresh state of the DRAM, and resumes by using the boot image held in the DRAM. According to the information processing apparatus described in JP-A-2016-51925, the boot image is developed in the DRAM and the DRAM is shifted to the self-refresh state before the sub system shifts to the power saving state, so that it is not necessary to develop the boot image in the DRAM when the sub system returns from the power saving state. Therefore, it is possible to shorten time required to return from the power saving state.

For example, in the information processing apparatus described in JP-A-2016-51925, when the sub system, which is the sub circuit, returns from the power saving state, the power supply control unit of the main circuit needs to transmit a return signal having a value indicating the return from the power saving state to the sub system. That is, in an electronic device having the same configuration as that of the information processing apparatus described in JP-A-2016-51925, when the sub circuit returns from the power saving state, the main circuit needs to transmit the return signal to the sub system. Therefore, there is a risk that the return signal is affected by noise when the return signal propagates from the main circuit to the sub circuit and a wrong return signal is transferred to the sub system. In particular, when the main circuit and the sub circuit are far away from each other, an important signal related to the return of the sub circuit is easily affected by noise, so certain measures should be taken. Therefore, a cost increase of the electronic device is unavoidable.

SUMMARY

An aspect of an electronic device according to the present disclosure includes
a main circuit including a processor,
a sub circuit that transits between a plurality of states including a first state and a second state where power consumption is smaller than that in the first state, and
a power supply circuit that supplies electric power to the main circuit and the sub circuit.
An electrical distance between the main circuit and the power supply circuit is shorter than an electrical distance between the main circuit and the sub circuit,
the processor determines whether or not to cause the sub circuit to transit from the second state to the first state, and when determining to cause the sub circuit to transit, the processor increases electric power supplied from the power supply circuit to the sub circuit, and
the sub circuit transits from the second state to the first state in response to increase of the electric power supplied from the power supply circuit.

An aspect of an electronic device according to the present disclosure includes
a main circuit including a processor,
a sub circuit that transits between a plurality of states including a first state and a second state where power consumption is smaller than that in the first state, and
a relay circuit.
An electrical distance between the main circuit and the relay circuit is shorter than an electrical distance between the main circuit and the sub circuit,
the processor determines whether or not to cause the sub circuit to transit to the second state, and when determining to cause the sub circuit to transit, the processor issues a first instruction to the sub circuit without through the relay circuit,
the sub circuit transits to the second state when receiving the first instruction,
the processor determines whether or not to cause the sub circuit to transit from the second state to the first state, and when determining to cause the sub circuit to transit, the processor issues a second instruction to the relay circuit,
the relay circuit performs relay processing when receiving the second instruction, and
the sub circuit transits from the second state to the first state in response to a fact that the relay circuit performs the relay processing.

An aspect of an electronic device according to the present disclosure includes
a main circuit,
a sub circuit that transits between a plurality of states including a first state and a second state where power consumption is smaller than that in the first state, and
a power supply circuit that supplies electric power to the main circuit and the sub circuit.

An electrical distance between the main circuit and the power supply circuit is shorter than an electrical distance between the main circuit and the sub circuit, and the sub circuit performs an operation based on an instruction from the main circuit in the first state, and transits from the second state to the first state without depending on an instruction from the main circuit in the second state.

In an aspect of the electronic device,
the sub circuit need not issue an instruction to the power supply circuit.

In an aspect of the electronic device,
the processor may issue the first instruction to the sub circuit through a cable.

In an aspect of the electronic device,
the sub circuit may transit from the first state to the second state according to the first instruction.

In an aspect of the electronic device,
the main circuit may issue the instruction to the sub circuit through a cable.

In an aspect of the electronic device,
the sub circuit may transit from the first state to the second state according to the instruction.

In an aspect of the electronic device,
the main circuit need not issue an instruction to the sub circuit to transit from the second state to the first state.

In an aspect of the electronic device,
the processor may be a main processor, and
the sub circuit may have a sub processor.

In an aspect of the electronic device,
the main circuit may have a main processor, and
the sub circuit may have a sub processor.

In an aspect of the electronic device,
the power supply circuit may convert an AC voltage supplied from a commercial power supply into an DC voltage and may supply electric power based on the DC voltage to the main circuit and the sub circuit.

In an aspect of the electronic device,
when the sub circuit is in the second state, a supply line that supplies electric power from the power supply circuit to the sub circuit when the sub circuit is in the first state may be disconnected.

An aspect of the electronic device may further include
an external interface unit that receives an instruction from outside the electronic device, and
the processor may determine whether or not to cause the sub circuit to transit from the second state to the first state based on an instruction received from the external interface unit.

In an aspect of the electronic device,
an electrical distance between the main circuit and the power supply circuit may be 30 cm or less, and
an electrical distance between the main circuit and the sub circuit may be 80 cm or more.

In an aspect of the electronic device,
an electrical distance between the main circuit and the relay circuit may be 30 cm or less, and
an electrical distance between the main circuit and the sub circuit may be 80 cm or more.

An aspect of the electronic device may further include
a register that stores a return flag, and
the sub circuit may start a first operation when the return flag has a first value and may start a second operation different from the first operation when the return flag has a second value.

An aspect of the electronic device may further include
a volatile memory, and
a power supply monitor circuit that switches the return flag from the second value to the first value when electric power supplied to the volatile memory becomes less than a threshold value.

In an aspect of the electronic device,
when the sub circuit receives an instruction to transit to the second state from the main circuit, the sub circuit may protect data of the volatile memory and transit to the second state, and
the sub circuit may use the protected data of the volatile memory after transiting from the second state to the first state.

In an aspect of the electronic device,
the sub circuit may protect data of the volatile memory by switching the volatile memory to a self-refresh mode.

An aspect of the electronic device may further include
a first circuit substrate,
a second circuit substrate, and
a third circuit substrate,
the main circuit may be provided on the first circuit substrate,
the sub circuit may be provided on the second circuit substrate, and
the power supply circuit may include
a switch which is provided on the first circuit substrate and is switched by the main circuit, and
a conversion circuit which is provided on the third circuit substrate and performs voltage conversion, and
may supply electric power based on a voltage converted by the conversion circuit to the sub circuit through the switch.

An aspect of a circuit substrate according to the present disclosure includes
a power receiving circuit that receives electric power from a power supply circuit that supplies electric power to a main circuit,
a sub circuit that operates based on the electric power received by the power receiving circuit, and
a connector to which a cable coupled to the main circuit is coupled.

The sub circuit transits between a plurality of states including a first state and a second state where power consumption is smaller than that in the first state, and
the sub circuit performs an operation based on an instruction received from the main circuit through the connector in the first state, and transits from the second state to the first state without receiving an instruction from the main circuit through the connector in the second state.

In an aspect of the circuit substrate,
the sub circuit need not issue an instruction to the power supply circuit.

In an aspect of the circuit substrate,
the main circuit may issue the instruction to the sub circuit through the cable.

In an aspect of the circuit substrate,
the sub circuit may transit from the first state to the second state according to the instruction.

In an aspect of the circuit substrate,
the main circuit need not issue an instruction to the sub circuit to transit from the second state to the first state.

In an aspect of the circuit substrate,
the main circuit may have a main processor, and
the sub circuit may have a sub processor.

In an aspect of the circuit substrate,
the power supply circuit may convert an AC voltage supplied from a commercial power supply into an DC voltage and may supply electric power based on the DC voltage to the main circuit and the sub circuit.

In an aspect of the circuit substrate, when the sub circuit is in the second state, a supply line that supplies electric power from the power supply circuit to the sub circuit when the sub circuit is in the first state may be disconnected.

In an aspect of the circuit substrate, an electrical distance between the main circuit and the power supply circuit may be 30 cm or less, and an electrical distance between the main circuit and the sub circuit may be 80 cm or more.

An aspect of the circuit substrate may further include a register that stores a return flag, and the sub circuit may start a first operation when the return flag has a first value and may start a second operation different from the first operation when the return flag has a second value.

An aspect of the circuit substrate may further include a volatile memory, and a power supply monitor circuit that switches the return flag from the second value to the first value when electric power supplied to the volatile memory becomes less than a threshold value.

In an aspect of the circuit substrate, when the sub circuit receives an instruction to transit to the second state from the main circuit, the sub circuit may protect data of the volatile memory and transit to the second state, and the sub circuit may use the protected data of the volatile memory after transiting from the second state to the first state.

In an aspect of the circuit substrate, the sub circuit may protect data of the volatile memory by switching the volatile memory to a self-refresh mode.

DESCRIPTION OF EXEMPLARY EMBODIMENTS

Hereinafter, preferred embodiments of the present disclosure will be described in detail with reference to the drawings. The drawings to be referred are for convenience of description. The embodiments described below do not unreasonably limit the contents of the present disclosure described in the claims. Further, all of the constituents described below are not necessarily essential constituent elements of the disclosure.

1. First Embodiment 1-1. Structure of Electronic Device

Hereinafter, an electronic device 1 of a first embodiment, which is an example of the electronic device of the present disclosure, will be described with reference to the drawings. The electronic device of the first embodiment is a complex machine including a printer unit and a scanner unit.

Figure 1:
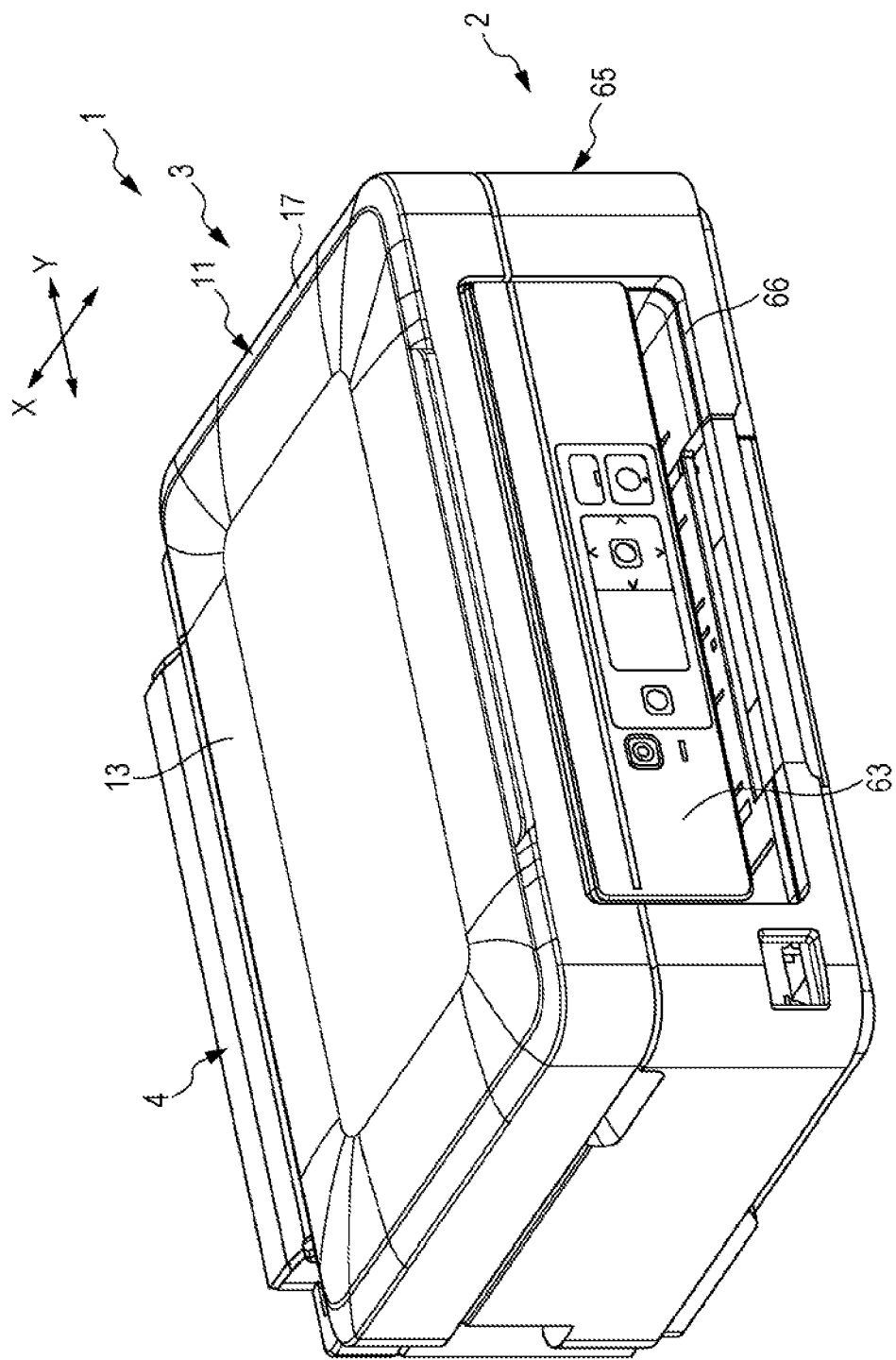
FIG. 1 is an external appearance perspective view showing an electronic device of a first embodiment.

FIG. 1 is an external appearance perspective view showing the electronic device 1 which is a complex machine. As shown in FIG. 1, the electronic device 1 includes a printer unit 2 which is an image recording apparatus and a scanner unit 3 which is an image reading apparatus. Specifically, the electronic device 1 integrally includes the printer unit 2 which is an apparatus main body and the scanner unit 3 which is an upper unit arranged over the printer unit 2. In the description below, a front/rear direction in FIG. 1 is defined as an X direction, and a left/right direction is defined as a Y direction. As shown in FIG. 1, the printer unit 2 includes a transport unit (not shown in the drawings) that transports a recording medium such as printing paper and cut-form paper along a transport path, a printing unit (not shown in the drawings) which is arranged above the transport path and performs print processing on the recording medium by an ink jet method, a panel type operation unit 63 arranged on a front surface, an apparatus frame (not shown in the drawings) mounted with the transport unit, the printing unit, and the operation unit 63, and an apparatus housing 65 that covers the above units and the apparatus frame. The apparatus housing 65 is provided with an ejection port 66 from which a print-finished recording medium is ejected. Although not shown in FIG. 1, a USB port and a power supply port are arranged in a lower portion of a rear surface of the printer unit 2. That is, the electronic device 1 is configured to be able to be coupled to a computer or the like through the USB port.

The scanner unit 3 is rotatably supported by the printer unit 2 through a hinge part 4 at a rear end portion and openably and closably covers an upper portion of the printer unit 2. In other words, when the scanner unit 3 is pulled up in a rotation direction, an upper surface opening portion of the printer unit 2 is exposed, so that the inside of the printer unit 2 is exposed through the upper surface opening portion. On the other hand, when the scanner unit 3 is pulled down in the rotation direction and the scanner unit 3 is mounted on the printer unit 2, the scanner unit 3 covers the upper surface opening portion. When the scanner unit 3 is opened in this way, an ink cartridge can be exchanged and a paper jam can be cleared.

Figure 2:
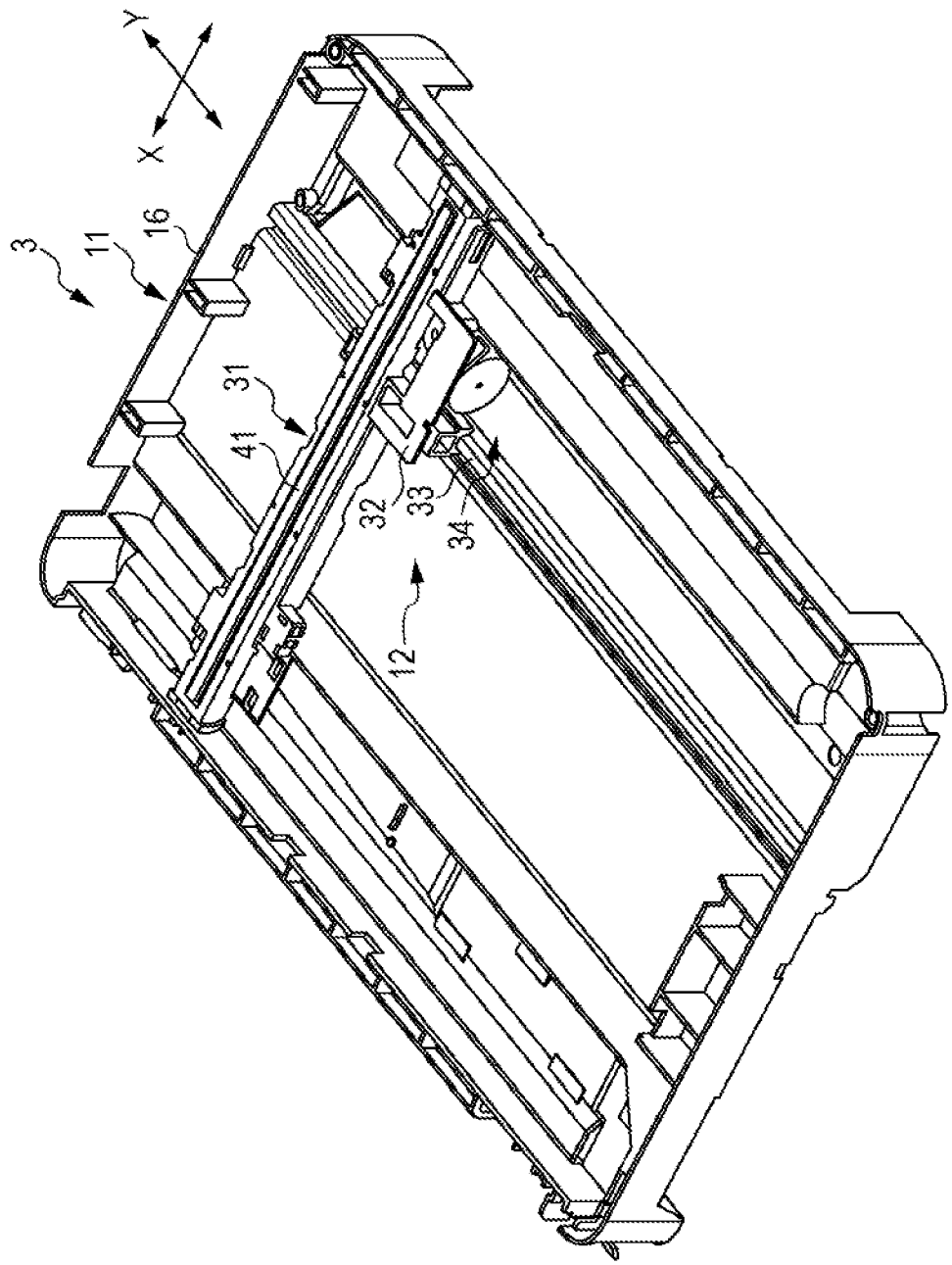
FIG. 2 is a perspective view showing an internal structure of a scanner unit.

FIG. 2 is a perspective view showing an internal structure of the scanner unit 3. As shown in FIGS. 1 and 2, the scanner unit includes an upper frame 11 which is a housing, an image reading unit 12 housed in the upper frame 11, and an upper lid 13 rotatably supported over the upper frame 11. As shown in FIG. 2, the upper frame 11 includes a box-shaped lower case 16 that houses the image reading unit 12 and an upper case 17 that covers a top surface of the lower case 16. The upper case 17 is widely arranged with a document mounting plate made of glass (not shown in the drawings), and a medium to be read whose surface to be read faces down is mounted on the document mounting plate. On the other hand, the lower case 16 is formed into a shallow box shape whose upper surface is open.

As shown in FIG. 2, the image reading unit 12 includes a sensor unit 31 of a line sensor system, a sensor carriage 32 mounted with the sensor unit 31, a guide shaft 33 that extends in a Y axis direction and slidably supports the sensor carriage 32, and a self-traveling type sensor moving mechanism 34 that moves the sensor carriage 32 along the guide shaft 33. The sensor unit 31 has an image sensor module 41 which is a CMOS (Complementary Metal-Oxide-Semiconductor) line sensor extending in an X axis direction, and is reciprocated in the Y axis direction along the guide shaft 33 by the motor-driven sensor moving mechanism 34. Thereby, an image on the medium to be read on the document mounting plate is read. The sensor unit 31 may be a CCD (Charge Coupled Device) line sensor.

1-2. Functional Configuration of Electronic Device

Figure 3:
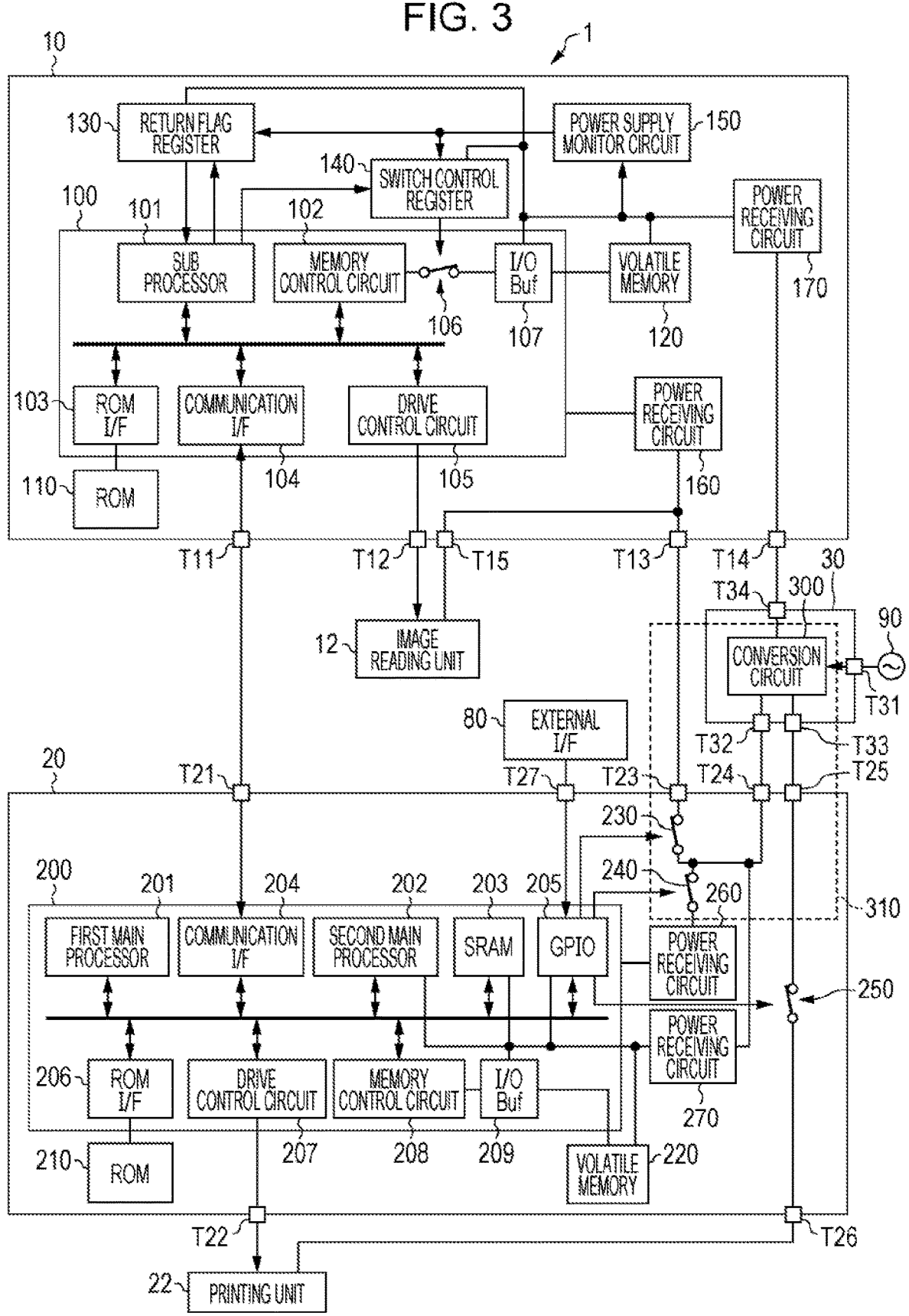
FIG. 3 is a diagram showing a functional configuration of the electronic device of the first embodiment.

FIG. 3 is a functional block diagram showing a functional configuration of the electronic device 1 which is a complex machine. As shown in FIG. 3, the electronic device 1 includes a main substrate 20 which is a first circuit substrate, a sub substrate 10 which is a second circuit substrate, and a power supply substrate 30 which is a third circuit substrate. The sub substrate 10 may be a substrate to be added to the main substrate 20.

The main substrate 20 is provided with seven connectors T21 to T27. The sub substrate 10 is provided with five connectors T11 to T15. The power supply substrate 30 is provided with four connectors T31 to T34.

The connector T11 is coupled with the connector T21, the connector T13 is coupled with the connector T23, the connector T14 is coupled with the connector T34, the connector T24 is coupled with the connector T32, and the connector T33 is coupled with the connector T25, by cables (not shown in the drawings) respectively.

Each of the connectors T12 and T15 is coupled to the image reading unit 12 by a cable not shown in the drawings. Each of the connectors T22 and T26 is coupled to a printing unit 22 by a cable not shown in the drawings. The connector T31 is coupled to a commercial power supply 90 by a cable not shown in the drawings.

The connector T27 is coupled to an external interface unit 80 by a cable not shown in the drawings. The external interface unit 80 receives an instruction from the outside of the electronic device 1. The external interface unit 80 may be, for example, a power supply switch and a USB port (not shown in the drawings) included in the electronic device 1.

Some of the connectors T11 to T 15 may be appropriately realized as one connector, some of the connectors T21 to T 27 may be appropriately realized as one connector, and some of the connectors T31 to T 34 may be appropriately realized as one connector.

The power supply substrate 30 is provided with a conversion circuit 300 that performs voltage conversion. The conversion circuit 300 converts an AC voltage supplied from the commercial power supply 90 through the connector T31 into a DC voltage and outputs the DC voltage to the connector T32. Furthermore, the conversion circuit 300 converts an AC voltage supplied from the commercial power supply 90 into a DC voltage and outputs the DC voltage to the connector T33. The DC voltage outputted to the connector T32 and the DC voltage outputted to the connector T33 may have the same voltage level or may have different voltage levels.

The main substrate 20 is provided with a main circuit 200, a ROM (Read Only Memory) 210, a volatile memory 220, a switch 230, a switch 240, a switch 250, a power receiving circuit 260, and a power receiving circuit 270.

The main circuit 200 performs control of supplying electric power to the sub circuit 100 and the image reading unit 12, communication processing with the sub circuit 100, control of supplying electric power to the printing unit 22, drive control of the printing unit 22, and the like. The main circuit 200 transits between a plurality of states including a normal operation state and a sleep state that is a power saving state where power consumption is smaller than that in the normal operation state. Furthermore, the plurality of states include a start-up state in which a start-up operation where the main circuit 200 transits into the normal operation state is performed when electric power begins to be supplied from the commercial power supply 90 to the conversion circuit 300, a sleep shift operation state in which a sleep shift operation where the main circuit 200 transits from the normal operation state to a sleep state is performed, and a sleep return operation state in which a sleep return operation where the main circuit 200 transits from the sleep state to the normal operation state is performed. The main circuit 200 transits from the start-up state to the normal operation state, transits from the normal operation state to the sleep state through the sleep shift operation state, and transits from the sleep state to the normal operation state through the sleep return operation state. The power saving state may have a plurality of stages of different power consumptions.

In the present embodiment, the main circuit 200 includes a first main processor 201, a second main processor 202, a SRAM (Static Random Access Memory) 203, a communication interface circuit 204, a GPIO (General Purpose Input Output) 205, a ROM interface circuit 206, a drive control circuit 207, a memory control circuit 208, and an input/output buffer 209. The main circuit 200 may be realized as a one-chip integrated circuit.

The first main processor 201 operates in the start-up state, the normal operation state, the sleep shift operation state, and the sleep return operation state, and stops operation in the sleep state. The first main processor 201 controls operations of the communication interface circuit 204, the ROM interface circuit 206, the drive control circuit 207, and the memory control circuit 208. Specifically, when electric power begins to be supplied to the main circuit 200, the first main processor 201 executes a command code stored in a predetermined address in the ROM 210 and thereby reads data stored in the ROM 210 through the ROM interface circuit 206 and copies the data into the volatile memory 220. Thereafter, the first main processor 201 jumps to a predetermined address in the volatile memory 220 and executes a command code that is the data copied into the volatile memory 220. Thereby, the first main processor 201 controls operation of each circuit included in the main circuit 200.

The first main processor 201 performs processing to output various signals from the GPIO 205 and various processing according to signals inputted from the GPIO 205. Furthermore, the first main processor 201 performs processing to copy data stored in the ROM 210 or the volatile memory 220 into the SRAM 203 and processing to set the volatile memory 220 into a self-refresh mode.

The second main processor 202 performs processing to control mechanisms such as a motor that drives the printing unit 22 in the normal operation state. In the sleep state, the second main processor 202 executes a command code that is data copied in the SRAM 203 and performs processing to output various signals from the GPIO 205 and various processing according to signals inputted from the GPIO 205. The second main processor 202 performs processing by using the SRAM 203 whose power consumption is smaller than that of the volatile memory 220, so that it is possible to reduce total power consumption in the sleep state.

The communication interface circuit 204 is a circuit for performing data communication with a communication interface circuit 104 of the sub circuit 100 through a cable coupled to the connectors T11 and T21 according to an instruction of the first main processor 201. For example, the communication interface circuits 104 and 204 are USB interface circuits, and the connectors T11 and T21 may be USB connectors to which a USB cable is coupled.

The GPIO 205 is a circuit for outputting a signal to the outside of the main circuit 200 or receives a signal inputted from the outside of the main circuit 200 according to an instruction from the first main processor 201 or the second main processor 202. Specifically, the GPIO 205 outputs control signals of the switches 230, 240, and 250, and is inputted with a signal from the external interface unit 80.

The ROM interface circuit 206 is a circuit for reading data from the ROM 210 according to an instruction from the first main processor 201.

The drive control circuit 207 generates various signals for driving and controlling the printing unit 22. The various signals generated by the drive control circuit 207 are supplied to the printing unit 22 through the connector T22, and the printing unit 22 performs printing according to the various signals.

The memory control circuit 208 is a circuit that controls writing of data to the volatile memory 220 and reading of data from the volatile memory 220 for the input/output buffer 209 according to a command from the first main processor 201.

The input/output buffer 209 is a circuit that sequentially writes data transferred from the memory control circuit 208 to the volatile memory 220 according to a write request from the memory control circuit 208 and sequentially transfers data read from the volatile memory 220 to the memory control circuit 208 according to a read request from the memory control circuit 208.

The volatile memory 220 may be a DRAM (Dynamic Random Access Memory). The DRAM consumes a large power but has high memory density as compared with SRAM, so that the DRAM can realize a large scale memory.

The switch 230 is a switch that conducts or does not conduct according to a voltage level of the control signal outputted from the GPIO 205. When the switch 230 conducts, the connector T24 and the connector T23 are electrically coupled, and a DC voltage outputted from the conversion circuit 300 and inputted into the main substrate 20 through the connectors T32 and T 24 is supplied to the sub substrate 10 through the switch 230 via the connectors T23 and T13. When the switch 230 does not conduct, the connector T24 and the connector T23 are electrically disconnected, and the DC voltage outputted from the conversion circuit 300 is not supplied to the sub substrate 10.

The switch 240 is a switch that conducts or does not conduct according to the voltage level of the control signal outputted from the GPIO 205. When the switch 240 conducts, the connector T24 and the power receiving circuit 260 are electrically coupled, and the DC voltage outputted from the conversion circuit 300 and inputted into the main substrate 20 through the connectors T32 and T 24 is supplied to the power receiving circuit 260 through the switch 240. When the switch 240 does not conduct, the connector T24 and the power receiving circuit 260 are electrically disconnected, and the DC voltage outputted from the conversion circuit 300 is not supplied to the power receiving circuit 260.

When the switch 240 conducts, the power receiving circuit 260 receives the DC voltage supplied from the conversion circuit 300 through the connector T24, converts the received DC voltage into a DC voltage of a desired voltage level, and supplies the converted DC voltage to the main circuit 200. In the present embodiment, when the switch 240 conducts, the power receiving circuit 260 supplies the DC voltage to the first main processor 201, the communication interface circuit 204, the ROM interface circuit 206, the drive control circuit 207, and the memory control circuit 208 of the main circuit 200. Therefore, the first main processor 201, the communication interface circuit 204, the ROM interface circuit 206, the drive control circuit 207, and the memory control circuit 208 can continue operation when the DC voltage is outputted from the conversion circuit 300 and the switch 240 conducts. In the present embodiment, when the DC voltage is outputted from the conversion circuit 300 and the switch 240 conducts, the main circuit 200 is in the start-up state, the normal operation state, the sleep shift operation state, or the sleep return operation state, and when the switch 240 does not conduct, the main circuit 200 is in the sleep state.

Here, when the conversion circuit 300 converts an AC voltage $V_{AC}$ supplied from the commercial power supply 90 into a DC voltage $V_{DC1}$ and outputs the DC voltage $V_{DC1}$ to the connector T32, electric power supplied to the power receiving circuit 260 is a product of the DC voltage $V_{DC1}$ supplied to the connector T24 and a current $I_{DC1}$ flowing from the connector T24 to the power receiving circuit 260. The power receiving circuit 260 converts the DC voltage $V_{DC1}$ into a DC voltage $V_{DC2}$ and supplies the DC voltage $V_{DC2}$ to a power supply terminal (not shown in the drawings) of the main circuit 200. At this time, electric power supplied to the main circuit 200 is a product of the DC voltage $V_{DC2}$ supplied to the power supply terminal and a current $I_{DC2}$ flowing through the power supply terminal. That is, the power receiving circuit 260 receives the electric power $V_{DC1} \times I_{DC1}$ supplied from the conversion circuit 300, converts the electric power $V_{DC1} \times I_{DC1}$ into electric power $V_{DC2} \times I_{DC2}$ and supplies the electric power $V_{DC2} \times I_{DC2}$ to the main circuit 200. In other words, a power supply circuit 310 including the conversion circuit 300 and the switch 240 converts the AC voltage $V_{AC}$ into the DC voltage $V_{DC1}$ and supplies the electric power $V_{DC2} \times I_{DC2}$ based on the DC voltage $V_{DC1}$ to the main circuit 200 through the switch 240. Alternatively, it can be said that the main circuit 200 operates based on the electric power $V_{DC1} \times I_{DC1}$ which the power receiving circuit 260 receives from the power supply circuit 310.

The power receiving circuit 270 receives a DC voltage supplied from the conversion circuit 300 through the connectors T32 and T 24, converts the received DC voltage into a DC voltage of a desired voltage level, and supplies the converted DC voltage to the second main processor 202, the SRAM 203, the GPIO 205, the input/output buffer 209, and the volatile memory 220. Therefore, the second main processor 202, the SRAM 203, the GPIO 205, the input/output buffer 209, and the volatile memory 220 can continue operation when electric power is supplied from the conversion circuit 300 to the power receiving circuit 270, that is, when the main circuit 200 is in the normal operation state or in the sleep state.

The switch 250 is a switch that conducts or does not conduct according to the voltage level of the control signal outputted from the GPIO 205. When the switch 250 conducts, the connector T24 and the connector T26 are electrically coupled, and a DC voltage outputted from the conversion circuit 300 and inputted into the main substrate 20 through the connectors T33 and T 25 is supplied to the printing unit 22 through the switch 250 via the connector T26. Thereby, the printing unit 22 can operate. When the switch 250 does not conduct, the connector T24 and the connector T26 are electrically disconnected, and the DC voltage outputted from the conversion circuit 300 is not supplied to the printing unit 22. Thereby, the printing unit 22 stops operation. When the main circuit 200 is in the normal operation state, under control of the first main processor 201, the switch 250 conducts and the printing unit 22 can operate, or the switch 250 does not conduct and the printing unit 22 stops operation. When the main circuit 200 is in the sleep state, the switch 250 does not conduct and the printing unit 22 stops operation.

The sub substrate 10 is provided with a sub circuit 100, a ROM 110, a volatile memory 120, a return flag register 130, a switch control register 140, a power supply monitor circuit 150, a power receiving circuit 160, and a power receiving circuit 170.

The sub circuit 100 performs communication processing with the main circuit 200, drive control of the image reading unit 12, and the like. The sub circuit 100 transits between a plurality of states including a normal operation state which is a first state, and a second state where the power consumption is smaller than that in the first state. The second state is a sleep state which is a power saving state. Furthermore, the plurality of states include a start-up state in which a start-up operation in which the sub circuit 100 transits into the normal operation state is performed when electric power begins to be supplied from the commercial power supply 90 to the conversion circuit 300, a sleep shift operation state in which a sleep shift operation where the sub circuit 100 transits from the normal operation state to a sleep state is performed, and a sleep return operation state in which a sleep return operation where the sub circuit 100 transits from the sleep state to the normal operation state is performed. The sub circuit 100 transits from the start-up state to the normal operation state, transits from the normal operation state to the sleep state through the sleep shift operation state, and transits from the sleep state to the normal operation state through the sleep return operation state.

In the present embodiment, the sub circuit 100 includes a sub processor 101, a memory control circuit 102, a ROM interface circuit 103, a communication interface circuit 104, a drive control circuit 105, a switch 106, and an input/output buffer 107. The sub circuit 100 may be realized as a one-chip integrated circuit.

The sub processor 101 operates in the start-up state, the normal operation state, the sleep shift operation state, and the sleep return operation state, and stops operation in the sleep state. The sub processor 101 controls operations of the memory control circuit 102, the ROM interface circuit 103, the communication interface circuit 104, and the drive control circuit 105. Specifically, when electric power begins to be supplied to the sub circuit 100, the sub processor 101 executes a command code stored in a predetermined address in the ROM 110 and thereby reads data stored in the ROM 110 through the ROM interface circuit 103 and copies the data into the volatile memory 120. Thereafter, the sub processor 101 jumps to a predetermined address in the volatile memory 120 and executes a command code that is the data copied into the volatile memory 120. Thereby, the sub processor 101 controls operation of each circuit included in the sub circuit 100.

The sub processor 101 performs processing to control mechanisms such as a motor that drives the image reading unit 12, setting processing of the return flag register 130 and the switch control register 140, and processing to set the volatile memory 120 into a self-refresh mode.

The communication interface circuit 104 is a circuit for performing data communication with the communication interface circuit 204 of the main circuit 200 through the cable coupled to the connectors T11 and T21 according to an instruction of the sub processor 101. In the present embodiment, in the normal operation state, the sub circuit 100 operates based on a signal received from the communication interface circuit 204 of the main circuit 200 through the communication interface circuit 104. Specifically, the main circuit 200 issues an instruction to the sub circuit 100 through the cable coupled to the connectors T11 and T21, and in the normal operation state, the sub circuit 100 performs an operation based on the instruction received from the main circuit 200 through the connector T11. In the present embodiment, the main circuit 200 issues an instruction to the sub circuit 100 to transit from the normal operation state to the sleep state, and the sub circuit 100 transits from the normal operation state to the sleep state according to the instruction.

The ROM interface circuit 103 is a circuit for reading data from the ROM 110 according to an instruction from the sub processor 101.

The drive control circuit 105 generates various signals for driving and controlling the image reading unit 12. The various signals generated by the drive control circuit 105 are supplied to the image reading unit 12 through the connector T12, and the image reading unit 12 performs image reading according to the various signals.

The memory control circuit 102 is a circuit that controls writing of data to the volatile memory 120 and reading of data from the volatile memory 120 for the input/output buffer 107 according to a command from the sub processor 101.

The switch 106 is a switch that conducts or does not conduct according to a voltage level of a control signal outputted from the switch control register 140. When the switch 106 conducts, the memory control circuit 102 and the input/output buffer 107 are electrically coupled. When the switch 106 does not conduct, the memory control circuit 102 and the input/output buffer 107 are electrically disconnected.

The input/output buffer 107 is a circuit that sequentially writes data transferred from the memory control circuit 102 to the volatile memory 120 according to a write request from the memory control circuit 102 and sequentially transfers data read from the volatile memory 120 to the memory control circuit 102 according to a read request from the memory control circuit 102 when the switch 106 conducts. The volatile memory 120 may be a DRAM.

In the present embodiment, when the sub circuit 100 receives a command to transit to the sleep state from the main circuit 200, the sub circuit 100 protects the data of the volatile memory 120 and transits to the sleep mode. Specifically, the sub circuit 100 protects the data of the volatile memory 120 by switching the volatile memory 120 to the self-refresh mode. Thereafter, the sub circuit 100 transits from the sleep state to the normal operation state, and then operates using the protected data of the volatile memory 120.

When the switch 230 provided on the main substrate 20 conducts, the power receiving circuit 160 receives the DC voltage supplied from the conversion circuit 300 through the connector T13, converts the received DC voltage into a DC voltage of a desired voltage level, and supplies the converted DC voltage to the sub circuit 100. In the present embodiment, when the switch 230 conducts, the power receiving circuit 160 supplies the DC voltage to the sub processor 101, the memory control circuit 102, the ROM interface circuit 103, the communication interface circuit 104, and the drive control circuit 105 of the sub circuit 100. Therefore, the sub processor 101, the memory control circuit 102, the ROM interface circuit 103, the communication interface circuit 104, and the drive control circuit 105 can continue operation when the DC voltage is outputted from the conversion circuit 300 and the switch 230 conducts. In the present embodiment, when the DC voltage is outputted from the conversion circuit 300 and the switch 230 conducts, the sub circuit 100 is in the start-up state, the normal operation state, the sleep shift operation state, or the sleep return operation state, and when the switch 230 does not conduct, the sub circuit 100 is in the sleep state.

When the switch 230 conducts, the DC voltage outputted from the conversion circuit 300 and inputted into the sub substrate 10 through the connector T13 is supplied to the image reading unit 12 through the connector T15. Thereby, the image reading unit 12 can operate. When the switch 230 does not conduct, the DC voltage outputted from the conversion circuit 300 is not supplied to the image reading unit 12. Thereby, the image reading unit 12 stops operation. Therefore, when the sub circuit 100 is in the normal operation state, the image reading unit 12 can operate, and when the sub circuit 100 is in the sleep state, the image reading unit 12 stops operation.

Here, when the conversion circuit 300 converts an AC voltage $V_{AC}$ supplied from the commercial power supply 90 into a DC voltage $V_{DC1}$ and outputs the DC voltage $V_{DC1}$ to the connector T32, electric power supplied to the power receiving circuit 160 is a product of the DC voltage $V_{DC1}$ supplied to the connector T13 and a current $I_{DC1}$ flowing from the connector T13 to the power receiving circuit 160. The power receiving circuit 160 converts the DC voltage $V_{DC1}$ into a DC voltage $V_{DC3}$ and supplies the DC voltage $V_{DC3}$ to a power supply terminal (not shown in the drawings) of the sub circuit 100. At this time, electric power supplied to the sub circuit 100 is a product of the DC voltage $V_{DC3}$ supplied to the power supply terminal and a current $I_{DC3}$ flowing through the power supply terminal. That is, the power receiving circuit 160 receives the electric power $V_{DC1} \times I_{DC1}$ supplied from the conversion circuit 300, converts the electric power $V_{DC1} \times I_{DC1}$ into electric power $V_{DC3} \times I_{DC3}$ and supplies the electric power $V_{DC3} \times I_{DC3}$ to the sub circuit 100. In other words, a power supply circuit 310 including the conversion circuit 300 and the switch 230 converts the AC voltage $V_{AC}$ into the DC voltage $V_{DC1}$ and supplies the electric power $V_{DC3} \times I_{DC3}$ based on the DC voltage $V_{DC1}$ to the sub circuit 100 through the switch 230. Alternatively, it can be said that the sub circuit 100 operates based on the electric power $V_{DC1} \times I_{DC1}$ which the power receiving circuit 160 receives from the power supply circuit 310. In the present embodiment, when the sub circuit 100 is in the normal operation state, the switch 230 conducts, so that the electric power is supplied from the power supply circuit 310 to the sub circuit 100. On the other hand, when the sub circuit 100 is in the sleep state, the switch 230 does not conduct, so that a supply line that supplies electric power from the power supply circuit 310 to the sub circuit 100 when the sub circuit 100 is in the normal operation state is disconnected.

In this way, the electric power is supplied from the power supply circuit 310 to the sub circuit 100 when the switch 230 conducts, and the electric power is not supplied from the power supply circuit 310 to the sub circuit 100 when the switch 230 does not conduct, so that the switch 230 functions as a relay circuit of electric power from the power supply circuit 310 to the sub circuit 100.

In the present embodiment, the first main processor 201 of the main circuit 200 determines whether or not to cause the sub circuit 100 to transit into the sleep state. When determining to cause the sub circuit 100 to transit into the sleep state, the first main processor 201 issues a first instruction to the sub circuit 100 without controlling the switch 230 which is the relay circuit. When the sub circuit 100 receives the first instruction, the sub circuit 100 transits into the sleep state. Specifically, the first main processor 201 transmits the first instruction through the communication interface circuit 204 and the connector T21. In other words, the first main processor 201 issues the first instruction to the sub circuit 100 through the cable coupled to the connectors T11 and T21. For example, the first main processor 201 determines whether or not to cause the sub circuit 100 to transit into the sleep state based on an instruction received from the external interface unit 80. For example, when the first main processor 201 receives an instruction to set the sub circuit 100 into the sleep state from the external interface unit 80, the first main processor 201 determines to cause the sub circuit 100 to transit into the sleep state and issues the first instruction to the sub circuit 100.

When the sub circuit 100 receives the first instruction through the connector T11 and the communication interface circuit 104, the sub circuit 100 detects the first instruction as a shifting factor to the sleep state and performs the sleep shift operation. When the sub processor 101 of the sub circuit 100 detects that the scanner unit 3 has not been used for a certain period of time since the scanner unit 3 was used most recently as a shifting factor to the sleep state, the sub processor 101 performs the sleep shift operation. When the sub circuit 100 informs the main circuit 200 that the sleep shift operation is completed and the main circuit 200 is informed from the sub circuit 100 that the sleep shift operation is completed, the sub circuit 100 is caused to transit to the sleep state by causing the switch 230 not to conduct and stopping power supply from the power supply circuit 310 to the sub circuit 100.

The power receiving circuit 170 receives the DC voltage supplied from the conversion circuit 300 through the connectors T34 and T14, converts the received DC voltage into a DC voltage of a desired voltage level, and supplies the converted DC voltage to the input/output buffer 107, the volatile memory 120, the return flag register 130, the switch control register 140, and the power supply monitor circuit 150. Therefore, the input/output buffer 107, the volatile memory 120, the return flag register 130, the switch control register 140, and the power supply monitor circuit 150 can continue operation when the electric power is supplied from the conversion circuit 300 to the power receiving circuit 170, that is, when the sub circuit 100 is in the normal operation state or in the sleep state.

The return flag register 130 stores a return flag for selecting an operation performed when the sub circuit 100 returns to the normal operation state. Specifically, when the return flag has a first value, the sub circuit 100 starts a first operation, and when the return flag has a second value, the sub circuit 100 starts a second operation different from the first operation. In the present embodiment, when the return flag has the first value, the sub circuit 100 performs the start-up operation and transits from the start-up state to the normal operation state, and when the return flag has the second value, the sub circuit 100 performs the sleep return operation and transits from the sleep state to the normal operation state. In the present embodiment, the sub processor 101 selects operation of the sub circuit 100 based on the value of the return flag. The sub processor 101 sets the return flag to the second value immediately before the sub circuit 100 transits to the sleep state.

The switch control register 140 stores a switch selection flag for selecting whether or not to cause the switch 106 to conduct. Specifically, the switch 106 conducts when the switch selection flag has a first value, and the switch 106 does not conduct when the switch selection flag has a second value. In the present embodiment, the switch 106 conducts when the sub circuit 100 is in the start-up state, the normal operation state, the sleep shift operation state, or the sleep return operation state, and the switch 106 does not conduct when the sub circuit 100 is in the sleep state. In the present embodiment, the sub processor 101 sets the switch selection flag to the second value immediately before the sub circuit 100 transits to the sleep state.

When the electric power supplied to the volatile memory 120 becomes less than a threshold value, the power supply monitor circuit 150 switches the return flag stored in the return flag register 130 from the second value to the first value. Furthermore, when the electric power supplied to the volatile memory 120 becomes less than a threshold value, the power supply monitor circuit 150 switches the switch selection flag stored in the switch control register 140 from the second value to the first value. Specifically, the power supply monitor circuit 150 monitors the DC voltage supplied from the power receiving circuit 170 to the volatile memory 120, and when the DC voltage becomes less than a predetermined voltage value, the power supply monitor circuit 150 switches the return flag and the switch selection flag from the second value to the first value.

Figure 4:
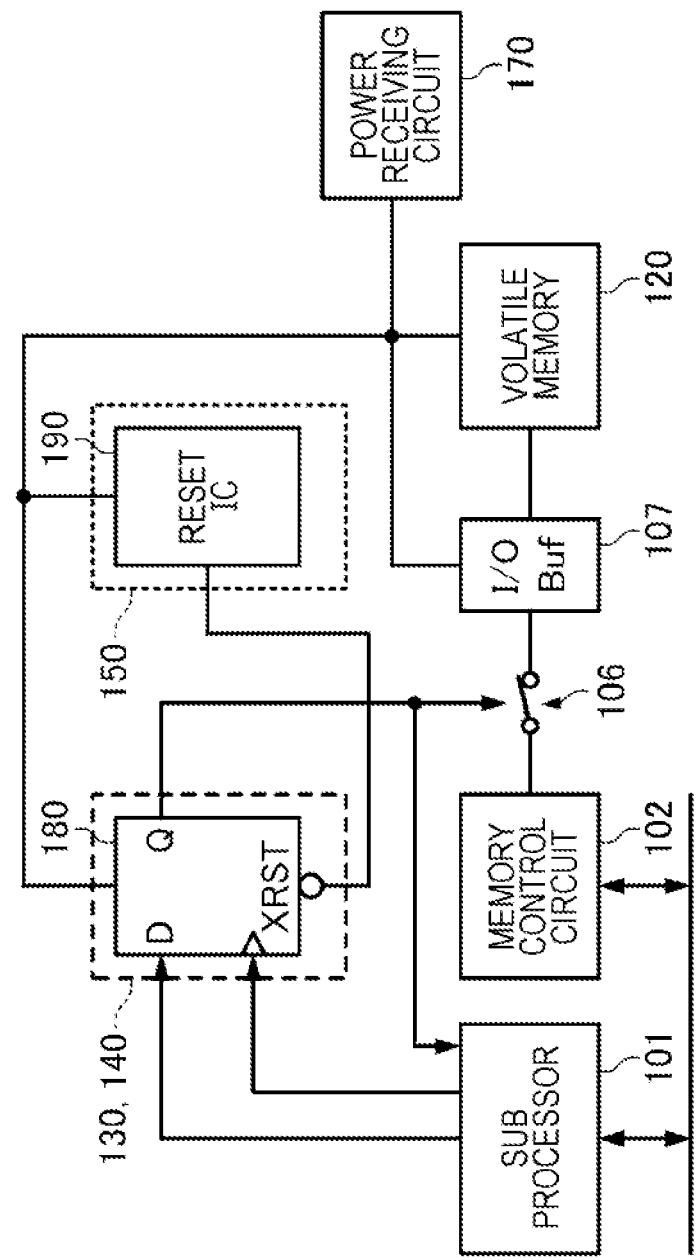
FIG. 4 is a diagram showing a configuration example of a return flag register and a switch control register.

One register may be used as both the return flag register 130 and the switch control register 140. FIG. 4 is a diagram showing a configuration example where one register is used as both the return flag register 130 and the switch control register 140.

In the example of FIG. 4, one register 180 is used as both the return flag register 130 and the switch control register 140. The sub processor 101 sets a second value "1" to a flag stored in the register 180 by outputting a high level data signal to a data input terminal D of the register 180 and outputting a pulse signal to a clock terminal of the register 180. Thereby, a high level signal is outputted from a data output terminal Q of the register 180 and the switch 106 becomes non-conductive.

In the example of FIG. 4, the reset IC (Integrated Circuit) 190 functions as the power supply monitor circuit 150, and when the DC voltage supplied from the power receiving circuit 170 to the volatile memory 120 becomes less than a predetermined voltage value, the reset IC 190 outputs a low level reset signal. The reset signal is inputted into an inverted reset terminal XRST of the register 180, and the flag stored in the register 180 switches from the second value "1" to the first value "0". Thereby, a low level signal is outputted from the data output terminal Q of the register 180 and the switch 106 becomes conductive.

When the value of the flag stored in the register 180 is "0", the sub processor 101 selects the first operation for transiting from the start-up state to the normal operation state as the operation of the sub circuit 100, and when the value of the flag stored in the register 180 is "1", the sub processor 101 selects the second operation for transiting from the sleep state to the normal operation state as the operation of the sub circuit 100.

Figure 5:
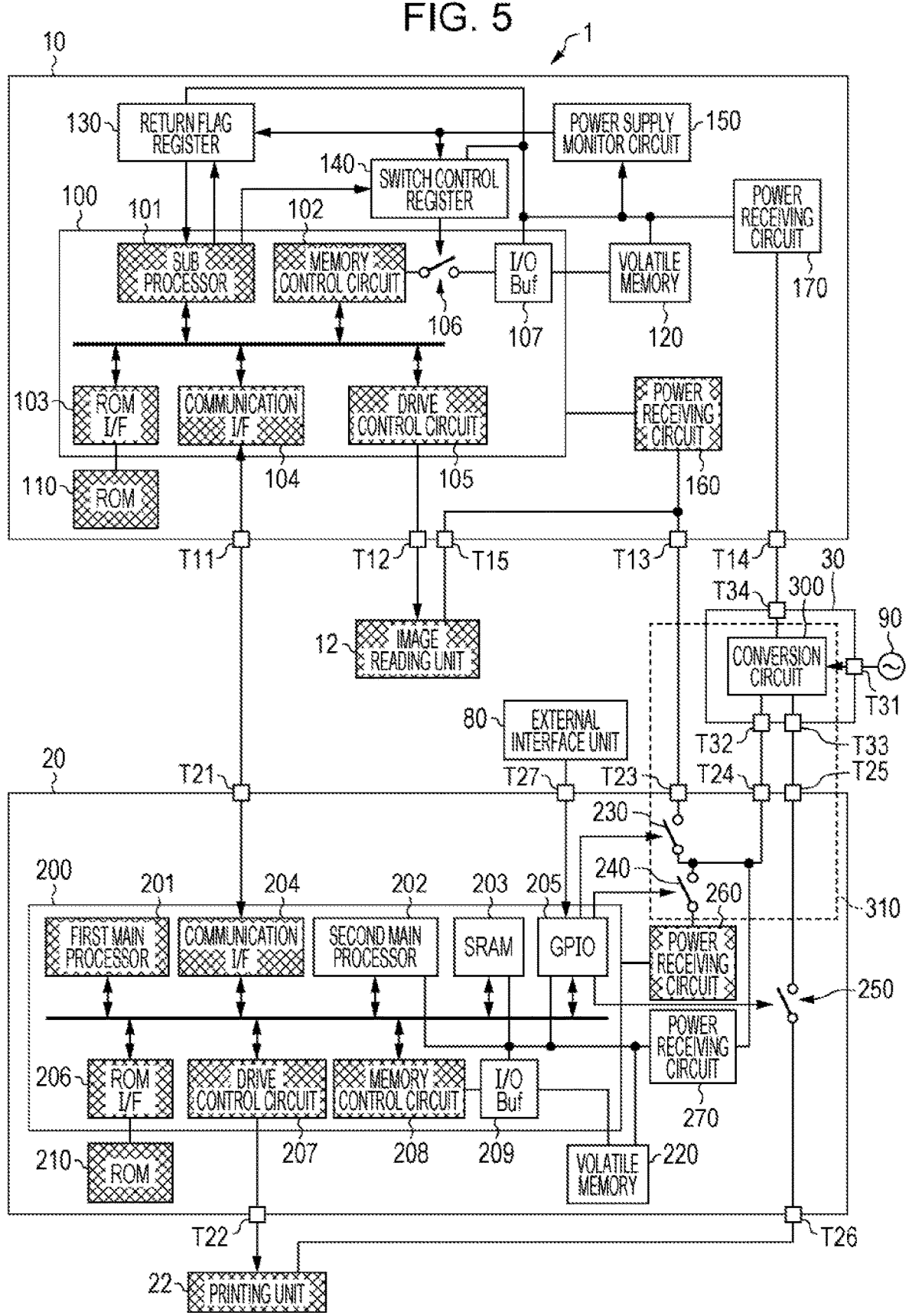
FIG. 5 is a diagram showing states of each component of the electronic device when both main and sub circuits are in a sleep state.

FIG. 5 shows states of each component of the electronic device 1 when both the main circuit 200 and the sub circuit 100 are in the sleep state. In FIG. 5, unshaded portions operate, and shaded portions do not operate. FIG. 3 shown previously shows states of each component of the electronic device 1 when both the main circuit 200 and the sub circuit 100 are in the normal operation state.

As described above, the main circuit 200 is provided on the main substrate 20, the sub circuit 100 is provided on the sub substrate 10, and the connector T21 of the main substrate 20 and the connector T11 of the sub substrate 10 are coupled by a cable. Therefore, it can be said that an electrical distance between the main circuit 200 and the sub circuit 100 is substantially equal to a sum of a length of wiring electrically coupling the main circuit 200 to the connector T21, a length of the cable, and a length of wiring electrically coupling the sub circuit 100 to the connector T11. In the present application, the "electrical distance" is a length measured along a path where an electrical signal is transmitted.

Here, in an electrical distance between the main circuit 200 and the power supply circuit 310, a length of the cable coupling the connector T21 to the connector T11 is dominant, and for example, the electrical distance is 80 cm or more. Therefore, a signal propagation path of a signal transmitted from the main circuit 200 to the sub circuit 100 through the cable is long, so that the signal is easily affected by noise. Therefore, when the first main processor 201 of the main circuit 200 issues an instruction to the sub circuit 100 to cause the sub circuit 100 to transit from the sleep state to the normal operation state through the cable, if the instruction is not transmitted to the sub circuit 100 due to effects of noise or the like, there is a risk that the sub circuit 100 is not transited from the sleep state to the normal operation state by the instruction. When the sub circuit 100 does not transit from the sleep state to the normal operation state, the main circuit 200 needs to detect that and issue the same instruction again to the sub circuit 100, so that it takes time for the sub circuit 100 to return to the normal operation state.

On the other hand, the switch 230 of the power supply circuit 310 is provided on the main circuit 20, and the conversion circuit 300 of the power supply circuit 310 is provided on the power supply substrate 30. Therefore, the electrical distance between the main circuit 200 and the power supply circuit 310 is substantially equal to a length of wiring electrically coupling the main circuit 200 to the switch 230, and for example, the electrical distance is 30 cm or less. In other words, an electrical distance between the main circuit 200 and the switch 230 that is a relay circuit is, for example, 30 cm or less. The electrical distance between the main circuit 200 and the power supply circuit 310 is a length of wiring electrically coupling the main circuit 200 to the power supply circuit 310 or a length of a signal propagation path between the main circuit 200 and the power supply circuit 310. Similarly, the electrical distance between the main circuit 200 and the switch 230 is a length of wiring electrically coupling the main circuit 200 to the switch 230 or a length of a signal propagation path between the main circuit 200 and the switch 230.

As described above, in the present embodiment, the electrical distance between the main circuit 200 and the power supply circuit 310 is shorter than the electrical distance between the main circuit 200 and the sub circuit 100. Alternatively, the electrical distance between the main circuit 200 and the switch 230 that is a relay circuit is shorter than the electrical distance between the main circuit 200 and the sub circuit 100. Therefore, an instruction from the main circuit 200 to the power supply circuit 310 is less subject to noise or the like, so that a risk that the instruction is not transmitted to the power supply circuit 310 is extremely small.

Therefore, in the present embodiment, the first main processor 201 of the main circuit 200 determines whether or not to cause the sub circuit 100 to transit from the sleep state to the normal operation state, and when determining to cause the sub circuit 100 to transit, the first main processor 201 causes the switch 230 to conduct through the GPIO 205 and increases electric power supplied from the power supply circuit 310 to the sub circuit 100. In other words, the first main processor 201 determines whether or not to cause the sub circuit 100 to transit from the sleep state to the normal operation state, and when determining to cause the sub circuit 100 to transit, the first main processor 201 issues a second instruction to the switch 230 which is a relay circuit. When the switch 230 receives the second instruction, the switch 230 performs relay processing of electric power.

For example, when the first main processor 201 detects that the upper lid 13 of the scanner unit 3 is opened or a recording medium is set on the document mounting plate of the scanner unit 3, the first main processor 201 determines to cause the sub circuit 100 to transit from the sleep state to the normal operation state. The first main processor 201 determines whether or not to cause the sub circuit 100 to transit from the sleep state to the normal operation state based on an instruction received from the external interface unit 80. For example, when the first main processor 201 receives an instruction to use the scanner unit 3 from the external interface unit 80, the first main processor 201 determines to cause the sub circuit 100 to transit from the sleep state to the normal operation state.

The sub circuit 100 transits from the sleep state to the normal operation state in response to increase of electric power supplied from the power supply circuit 310. In other words, the sub circuit 100 transits from the sleep state to the normal operation state in response to a fact that the switch 230, which is a relay circuit, performs relay processing of electric power. In this way, in the present embodiment, the main circuit 200 causes the sub circuit 100 to transit from the sleep state to the normal operation state by issuing an instruction to transit from the sleep state to the normal operation state to the power supply circuit 310 without issuing the instruction to the sub circuit 100. In other words, in the sleep state, the sub circuit 100 transits from the sleep state to the normal operation state without depending on an instruction from the main circuit 200, that is, without receiving an instruction from the main circuit 200 through the connector T11. In this way, when the sub circuit 100 is in the sleep state, the sub circuit 100 operates without receiving an instruction through the connector T11.

If the sub circuit 100 communicates with the main circuit 200 and tries to cause the sub circuit 100 to transit from the sleep state to the normal operation state by instructing the switch 230 of the power supply circuit 310 to conduct through the GPIO 205, there is a risk that a signal is not transmitted from the sub circuit 100 to the main circuit 200 due to effects of noise or the like and the sub circuit 100 cannot transit from the sleep state to the normal operation state. Therefore, in the present embodiment, the sub circuit 100 does not issues an instruction to the power supply circuit 310, and as described above, the main circuit 200 issues an instruction to the power supply circuit 310, and thereby causes the sub circuit 100 to transit from the sleep state to the normal operation state.

As described above, when the sub circuit 100 transits to the normal operation state, the sub circuit 100 selects the first operation for transiting from the start-up state to the normal operation state when the value of the return flag stored in the return flag register 130 provided on the sub substrate 10 is the first value and the second operation for transiting from the sleep state to the normal operation state when the value of the return flag is the second value. Here, the sub processor 101 sets the return flag to the second value immediately before the sub circuit 100 transits to the sleep state, and the power supply monitor circuit 150 provided on the sub substrate 10 switches the return flag from the second value to the first value when the electric power supplied to the volatile memory 120 becomes less than the threshold value. Therefore, it is not necessary to change the value of the return flag from the main circuit 200, whose electrical distance to the sub circuit 100 is long, through a cable, so that the risk of error of the return flag due to effects of noise or the like is small and the risk of error in an operation for the sub circuit 100 to transit to the normal operation state is reduced.

1-3. State Transition Operation of Sub Circuit

Figure 6:
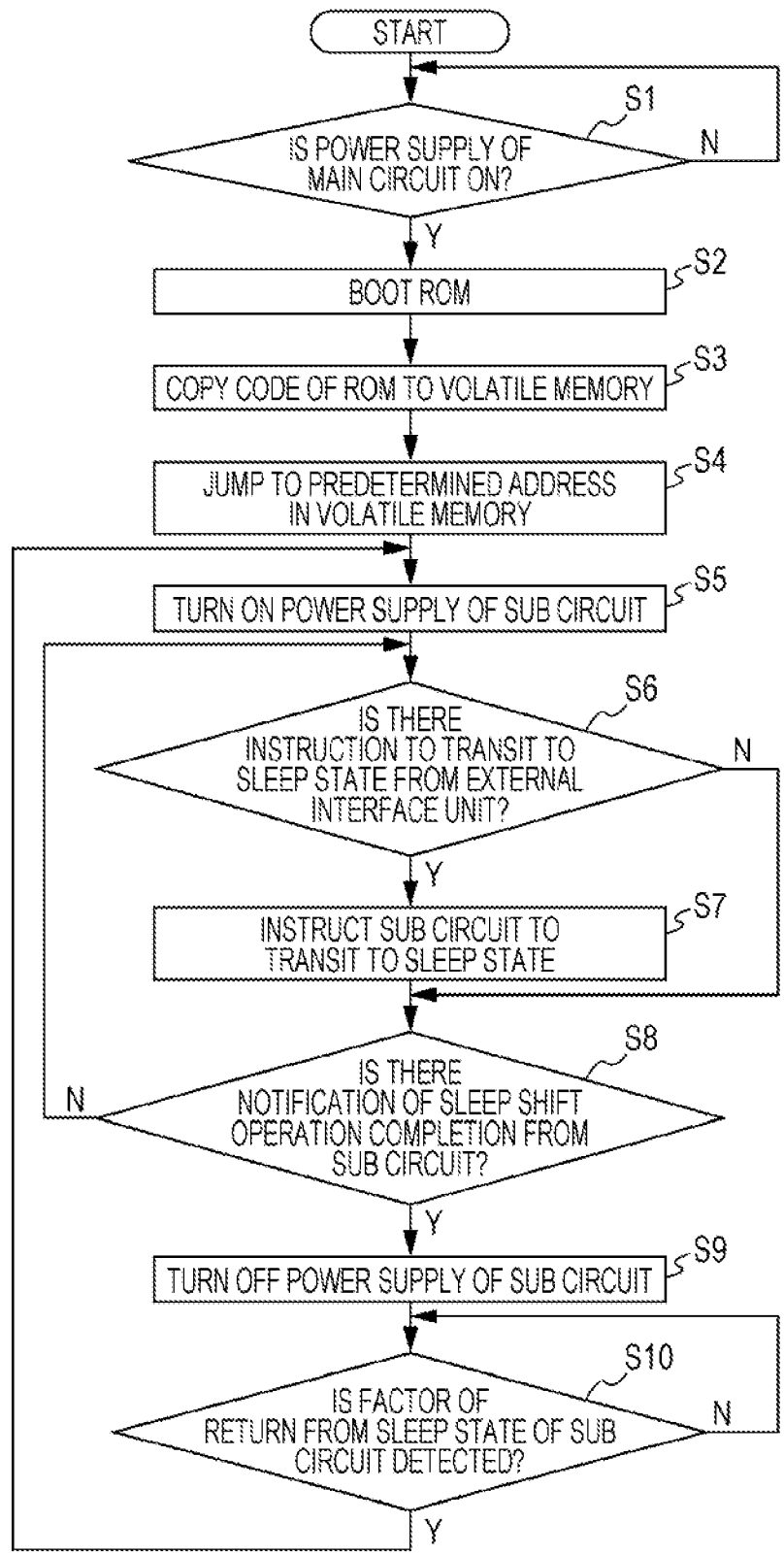
FIG. 6 is a flowchart showing a procedure where the main circuit controls state transition of the sub circuit.

FIG. 6 is a flowchart showing a procedure where the main circuit 200 controls state transition of the sub circuit 100. For example, the first main processor 201 performs processing of steps S2 to S10 in FIG. 6 by executing a program stored in the ROM 210 which is an information storage medium.

As shown in FIG. 6, when the power supply of the main circuit 200 is turned on, that is, when electric power begins to be supplied from the power supply circuit 310 to the main circuit 200 (Y of step S1), the first main processor 201 executes boot code stored in a predetermined address of the ROM 210 and performs various initialization processing (step S2).

Next, the first main processor 201 copies the code of the ROM 210 into the volatile memory 220 (step S3).

Next, the first main processor 201 jumps to a predetermined address in the volatile memory 220 (step S4).

Next, the first main processor 201 turns on the power supply of the sub circuit 100 (step S5). Specifically, the first main processor 201 starts supply of electric power from the power supply circuit 310 to the sub circuit 100 by causing the switch 230 to conduct through the GPIO 205.

Next, when the first main processor 201 receives an instruction to cause the sub circuit 100 to transit to the sleep state from the external interface unit 80 (Y of step S6), the first main processor 201 instructs the sub circuit 100 to transit to the sleep state (step S7). Specifically, the first main processor 201 issues a first instruction to perform a sleep shift operation to transit from the normal operation state to the sleep state to the sub circuit 100 through the communication interface circuit 204. When the first main processor 201 does not receive the instruction to cause the sub circuit 100 to transit to the sleep state from the external interface unit 80 (N of step S6), the first main processor 201 does not perform the processing of step S7.

Next, when the first main processor 201 receives a notification of sleep shift operation completion from the sub circuit 100 (Y of step S8), the first main processor 201 turns off the power supply of the sub circuit 100 (step S9). Specifically, the first main processor 201 stops supply of electric power from the power supply circuit 310 to the sub circuit 100 by causing the switch 230 not to conduct through the GPIO 205. When the first main processor 201 does not receive a notification of sleep shift operation completion from the sub circuit 100 (N of step S8), the first main processor 201 performs processing of step S6 and subsequent steps again.

Next, when the first main processor 201 detects a return factor from the sleep state of the sub circuit 100 (Y of step S10), the first main processor 201 turns on the power supply of the sub circuit 100 (step S5). Specifically, the first main processor 201 starts supply of electric power from the power supply circuit 310 to the sub circuit 100 by issuing the second instruction to the switch 230 through the GPIO 205 and causing the switch 230 to conduct. Then, the first main processor 201 performs processing of step S6 and subsequent steps again.

Figure 7:
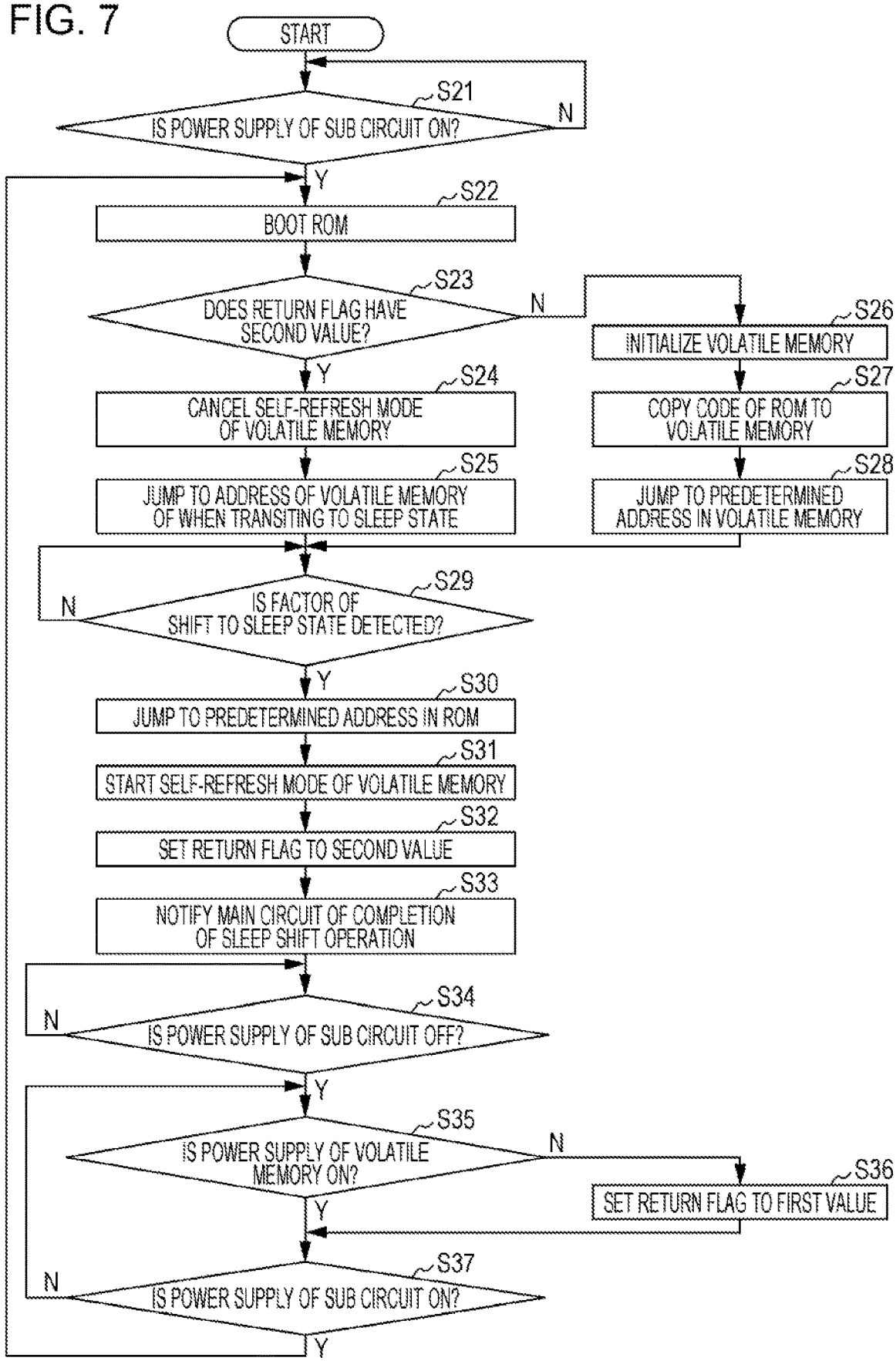
FIG. 7 is a flowchart showing a procedure of the state transition of the sub circuit.

FIG. 7 is a flowchart showing a procedure of the state transition of the sub circuit 100. For example, the sub processor 101 performs processing of steps S22 to S33 in FIG. 7 by executing a program stored in the ROM 110, which is an information storage medium, and a program copied into the volatile memory 120. The power supply monitor circuit 150 performs processing of step S36 in FIG. 7.

As shown in FIG. 7, when the power supply of the sub circuit 100 is turned on, that is, when electric power begins to be supplied from the power supply circuit 310 to the sub circuit 100 (Y of step S21), the sub processor 101 executes boot code stored in a predetermined address of the ROM 110 and performs various initialization processing (step S22).

Next, the sub processor 101 checks the value of the return flag (step S23), and when the return flag has the second value (Y of step S23), the sub processor 101 performs processing of steps S24 and S25 as the sleep return operation. Specifically, the sub processor 101 cancels the self-refresh mode of the volatile memory 120 (step S24) and jumps to address of the volatile memory 120 of when transiting to the sleep state (step S25).

When the return flag does not have the second value, that is, when the return flag has the first value (N of step S23), the sub processor 101 performs processing of steps S26 to S28 as a part of the start-up operation. Specifically, the sub processor 101 initializes the volatile memory 120 (step S26), copies code of the ROM 110 into the volatile memory 120 (step S27), and jumps to a predetermined address in the volatile memory 120 (step S28).

Next, when the sub processor 101 detects a shifting factor to the sleep state (Y of step S29), the sub processor 101 performs processing of steps S30 to S33 as the sleep shift operation. Specifically, the sub processor 101 jumps to a predetermined address in the ROM 110 (step S30), starts the self-refresh mode of the volatile memory 120 (step S31), sets the return flag to the second value (step S32), and notifies the main circuit 200 of completion of the sleep shift operation (step S33).

Next, when the power supply of the sub circuit 100 is turned off (step S34), the sub circuit 100 transits to the sleep state, and when the power supply of the volatile memory 120 is turned off (step S35), the power supply monitor circuit 150 sets the return flag to the first value (step S36). When the power supply of the sub circuit 100 is turned on (Y of step S37), the sub circuit 100 transits from the sleep state to the start-up state or the sleep return operation state, and the sub processor 101 performs processing of step S22 and subsequent steps again. Specifically, when the power supply is turned on, if the return flag has the first value, the sub circuit 100 transits from the sleep state to the start-up state, and if the return flag has the second value, the sub circuit 100 transits from the sleep state to sleep return operation state.

1-4. Operational Effects

As described above, in the electronic device 1 of the present embodiment, the main circuit 200 is provided on the main substrate 20 which is the first circuit substrate, the sub circuit 100 is provided on the sub substrate 10 which is the second circuit substrate, the power supply circuit 310 has the conversion circuit 300 and the switch 230, the conversion circuit 300 is provided on the power supply substrate 30 which is the third circuit substrate, and the switch 230 is provided on the main substrate 20. Therefore, the electrical distance between the main circuit 200 and the power supply circuit 310 is shorter than the electrical distance between the main circuit 200 and the sub circuit 100. In other words, the electrical distance between the main circuit 200 and the sub circuit 100 is longer than the electrical distance between the main circuit 200 and the power supply circuit 310. For example, when the electrical distance between the main circuit 200 and the sub circuit 100 is 80 cm or more, the main circuit 200 and the sub circuit 100 are far from each other, so that a signal propagating from the main circuit 200 to the sub circuit 100 is easily affected by noise. On the other hand, the electrical distance between the main circuit 200 and the power supply circuit 310 is 30 cm or less, and the main circuit 200 and the power supply circuit 310 are relatively close to each other, so that a signal propagating from the main circuit 200 to the power supply circuit 310 is less subject to noise.

The first main processor 201 of the main circuit 200 determines whether or not to cause the sub circuit 100 to transit from the sleep state, which is a power saving state, to the normal operation state, and when determining to cause the sub circuit 100 to transit, the first main processor 201 increases electric power supplied from the power supply circuit 310 to the sub circuit 100. The sub circuit 100 transits from the sleep state to the normal operation state in response to increase of electric power supplied from the power supply circuit 310. In the sleep state, the sub circuit 100 transits from the sleep state to the normal operation state without depending on an instruction from the main circuit 200, that is, without receiving an instruction from the main circuit 200 through the connector T11. Alternatively, the first main processor 201 of the main circuit 200 determines whether or not to cause the sub circuit 100 to transit from the sleep state to the normal operation state, and when determining to cause the sub circuit 100 to transit, the first main processor 201 issues the second instruction to the switch 230. When the switch 230 receives the second instruction, the switch 230 performs relay processing of electric power from the conversion circuit 300 to the sub circuit 100. The sub circuit 100 transits from the sleep state to the normal operation state in response to a fact that the switch 230 performs the relay processing. In other words, the main circuit 200 does not issue an instruction to the sub circuit 100 to transit from the sleep state to the normal operation state.

Therefore, according to the electronic device 1 or the sub substrate 10 of the present embodiment, the sub circuit 100 can return from the power saving state without receiving a return signal from the main circuit 200. The main circuit 200 issues an instruction to the power supply circuit 310 relatively close to the main circuit 200 in order to cause the sub circuit 100 to transit from the sleep state to the normal operation state, and the sub circuit 100 does not receive an instruction from the main circuit 200 relatively far from the sub circuit 100, so that a risk that the sub circuit 100 fails to return from the power saving state is reduced.

According to the electronic device 1 or the sub substrate 10 of the present embodiment, the sub circuit 100 does not issue an instruction to the power supply circuit 310, in particular to the switch 230 provided on the main substrate 20 relatively away from the sub circuit 100, so that there is no risk that an instruction from the sub circuit 100 is wrongly propagated to the power supply circuit 310 due to effects of noise or the like and thereby the sub circuit 100 fails to return from the power saving state.

In the electronic device 1 of the present embodiment, the main circuit 200 issues an instruction to the sub circuit 100 through the cable that couples the connectors T11 and T21, and the sub circuit 100 performs an operation based on the instruction from the main circuit 200 in the normal operation state. For example, the main circuit 200 issues an instruction to the sub circuit 100 to transit from the normal operation state to the sleep state, and the sub circuit 100 transits from the normal operation state to the sleep state according to the instruction. Alternatively, the first main processor 201 of the main circuit 200 determines whether or not to cause the sub circuit 100 to transit into the sleep state, and when determining to cause the sub circuit 100 to transit, the first main processor 201 issues the first instruction to the sub circuit 100 through the cable that couples the connectors T11 and T21 but without through the switch 230. When the sub circuit 100 receives the first instruction, the sub circuit 100 transits to the sleep state. Therefore, according to the electronic device 1 or the sub substrate 10 of the present embodiment, the sub substrate 10 can perform necessary processing and appropriately transit from the normal operation state to the sleep state according to the instruction from the main circuit 200.

In the electronic device 1 of the present embodiment, the sub substrate 10 is provided with the return flag register 130 that stores the return flag. The sub processor 101 of the sub circuit 100 sets the return flag to the second value immediately before the sub circuit 100 transits to the sleep state. The power supply monitor circuit 150 switches the return flag from the second value to the first value when the electric power supplied to the volatile memory 120 becomes less than the threshold value. When the return flag has the first value, the sub circuit 100 starts the first operation, and when the return flag has the second value, the sub circuit 100 starts the second operation different from the first operation. Specifically, the first operation is the start-up operation in which the sub circuit 100 transits into the normal operation state when electric power begins to be supplied from the commercial power supply 90 to the conversion circuit 300, and the second operation is the sleep return operation in which the sub circuit 100 transits from the sleep state to the normal operation state. That is, when electric power begins to be supplied from the power supply circuit 310, the sub circuit 100 can determine whether the sub circuit 100 is in the start-up state or has returned from the sleep state according to the value of the return flag. Therefore, according to the electronic device 1 or the sub substrate 10 of the present embodiment, the sub circuit 100 can return from the power saving state without receiving the return signal from the main circuit 200.

Furthermore, in the electronic device 1 of the present embodiment, when the sub circuit 100 receives a command to transit to the sleep state from the main circuit 200, the sub circuit 100 protects the data of the volatile memory 120 by switching the volatile memory 120 to the self-refresh mode and transits to the sleep mode. After transiting from the sleep state to the normal operation state, the sub circuit 100 uses the data of the volatile memory 120 protected by the self-refresh mode. Therefore, according to the electronic device 1 or the sub substrate 10 of the present embodiment, when the sub circuit 100 returns from the sleep state, the sub circuit 100 need not receive data executed immediately before the sub circuit 100 transits to the sleep state from the main circuit 200, so that it is possible to shorten time required to return from the power saving state.

2. Second Embodiment

Hereinafter, an electronic device 1 of a second embodiment, which is an example of the electronic device of the present disclosure, will be described with reference to the drawings. The electronic device of the second embodiment is an interactive projection system.

Figure 8:
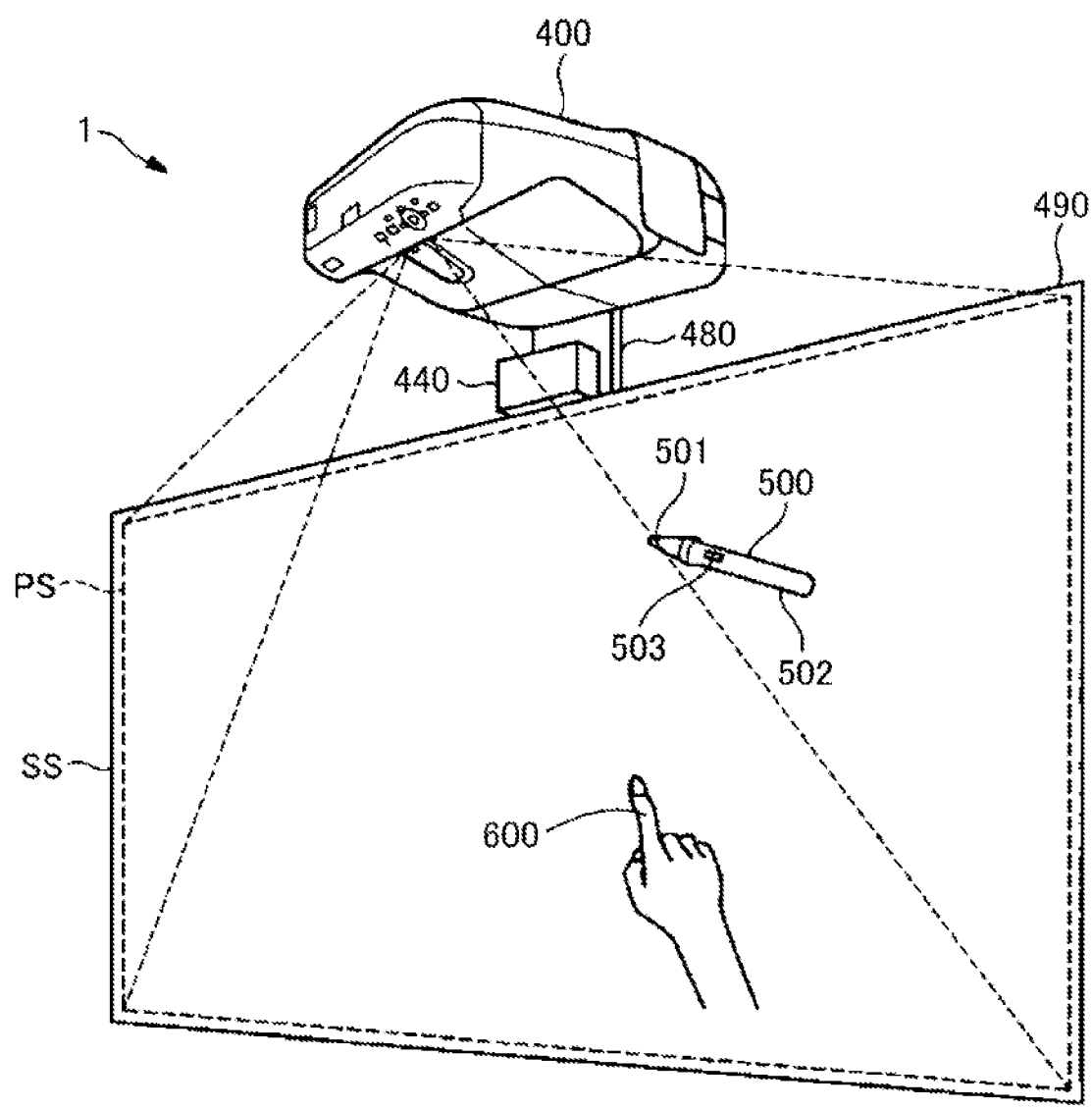
FIG. 8 is a perspective view of an electronic device of a second embodiment.

FIG. 8 is a perspective view of the electronic device 1 which is the interactive projection system. As shown in FIG. 8, the electronic device 1 has an interactive projector 400, a screen plate 490 that provides an operation surface, a layered detection light irradiation unit 440 which is a light curtain unit, and a spontaneous light emission indicating body 500. Although the layered detection light irradiation unit 440 is a part of the interactive projector 400, the layered detection light irradiation unit 440 is shown as a separate body for convenience of drawing in FIG. 8. The front surface of the screen plate 490 is used as a projection screen surface SS. The interactive projector 400 is fixed in front of and above the screen plate 490 by a support member 480. Although the projection screen surface SS is vertically arranged in FIG. 8, it is possible to horizontally arrange the projection screen surface SS and use the electronic device 1.

The interactive projector 400 projects a projection screen PS on the projection screen surface SS. The projection screen PS normally includes an image drawn in the interactive projector 400. When there is no image drawn in the interactive projector 400, light is irradiated from the interactive projector 400 to the projection screen PS, and white image is displayed.

The spontaneous light emission indicating body 500 is a pen type indicating body having a light emittable tip portion 501, a shaft portion 502 held by a user, and a button switch 503 provided on the shaft portion 502. The tip portion 501 of the spontaneous light emission indicating body 500 emits, for example, infrared light. In the electronic device 1, it is possible to use one or a plurality of non-light-emission indicating bodies 600, for example, non-light-emission pens or fingers, along with one or a plurality of spontaneous light emission indicating bodies 500.

Figure 9:
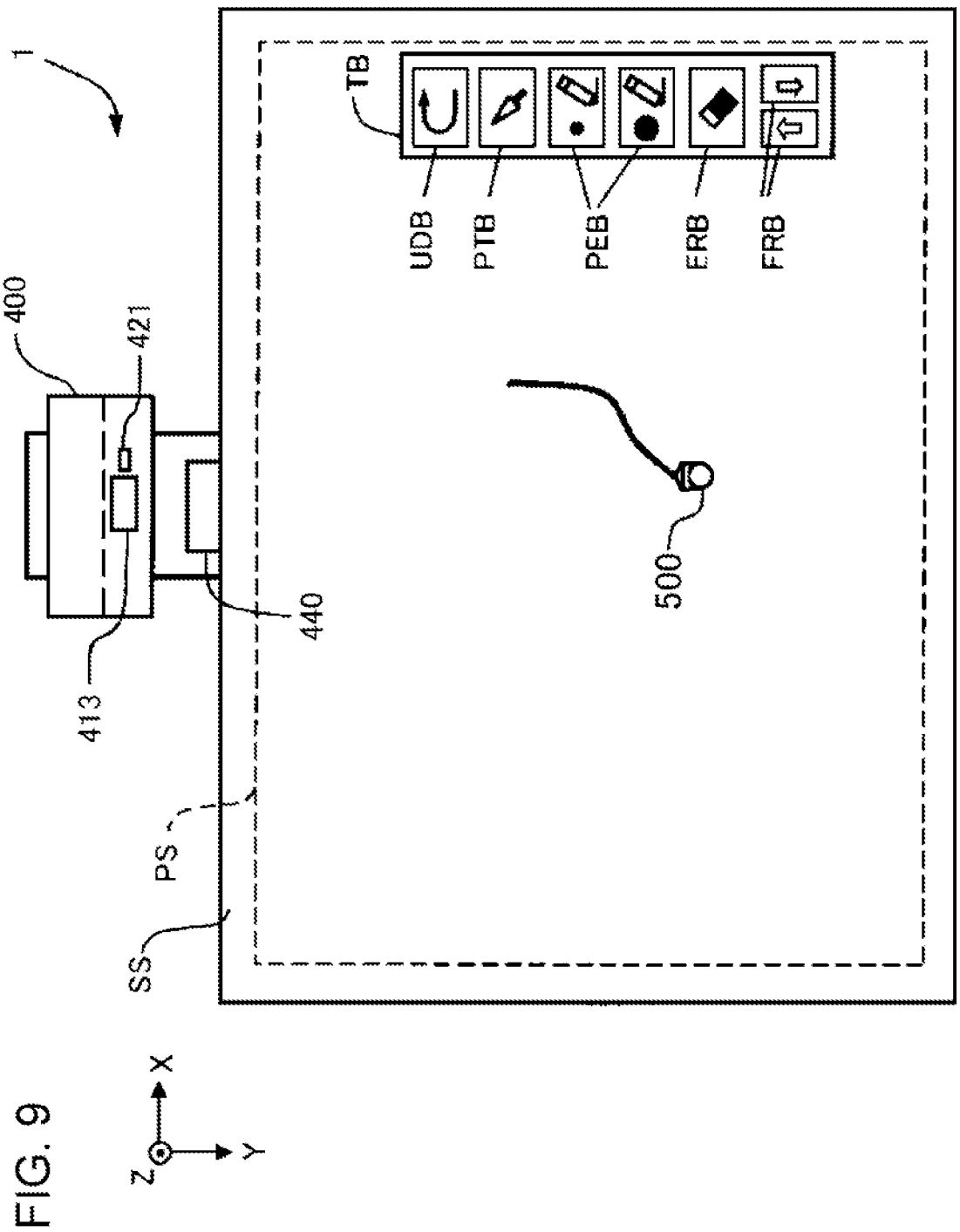
FIG. 9 is a front view of the electronic device of the second embodiment.
Figure 10:
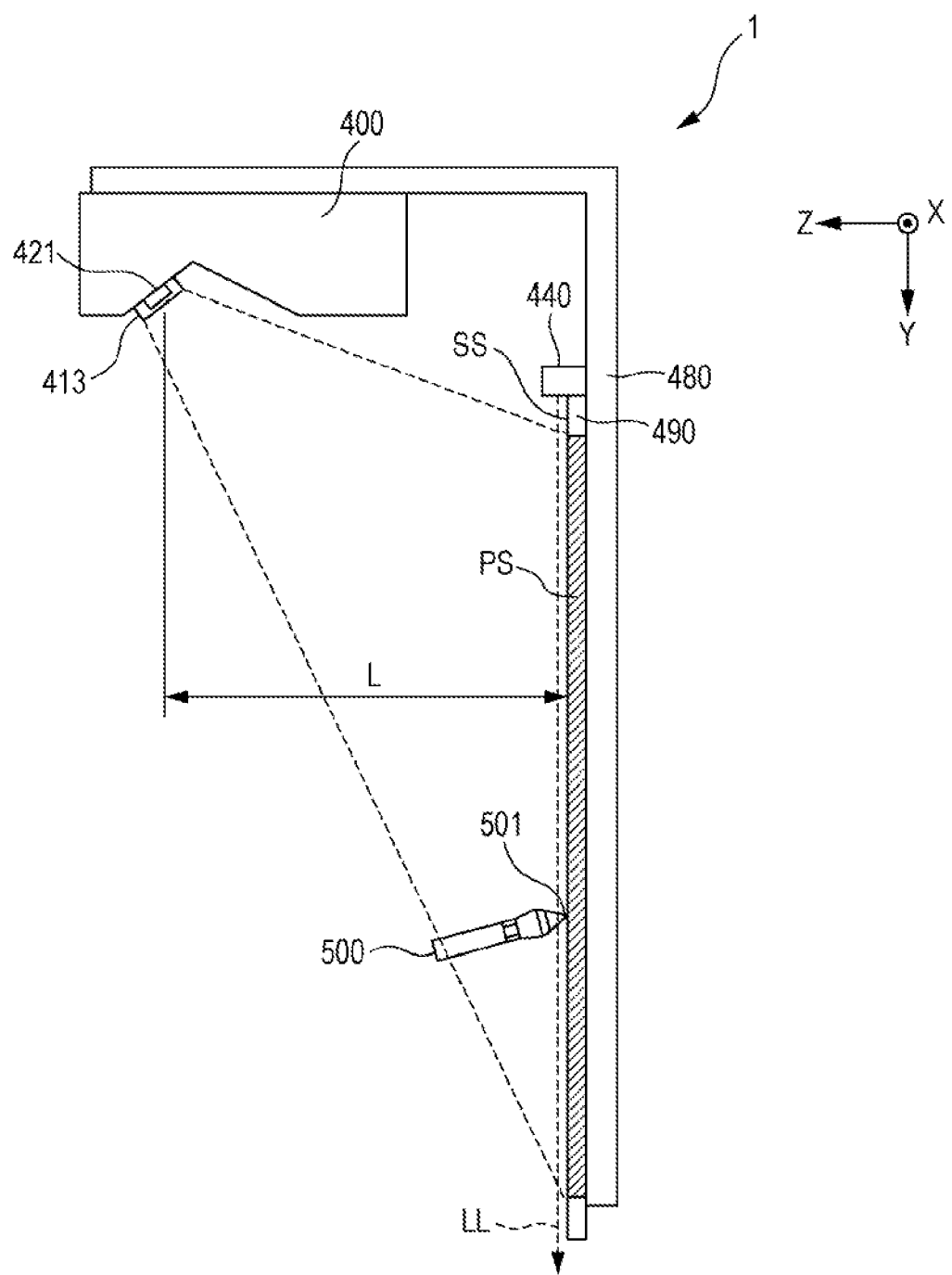
FIG. 10 is a side view of the electronic device of the second embodiment.

FIG. 9 is a front view of the electronic device 1. FIG. 10 is a side view of the electronic device 1. In the present embodiment, a direction along a left-right direction of the projection screen surface SS is defined as an X direction, a direction along a vertical direction of the projection screen surface SS is defined as a Y direction, and a direction along the normal line of the projection screen surface SS is defined as a Z direction. An upper left position on the projection screen surface SS in FIG. 9 is defined as the origin (0, 0) of coordinates (X, Y). For convenience, the X direction is also called a "left-right direction", the Y direction is also called a "vertical direction", and the Z direction is also called a "front/rear direction". In the Y direction, a direction from the interactive projector 400 to the projection screen PS is called a "downward direction". In FIG. 10, for convenience of drawing, a range of the projection screen PS on the screen plate 490 is hatched.

The interactive projector 400 has a projection lens 413 that projects the projection screen PS on the projection screen surface SS, a camera 421 that captures an image of a region of the projection screen PS, and the layered detection light irradiation unit 440 for irradiating layered detection light LL to the spontaneous light emission indicating body 500 and the non-light-emission indicating body 600. The layered detection light irradiation unit 440 is an irradiation unit that emits layered or curtain-like detection light LL over the entire surface of the projection screen PS in order to detect that the non-light-emission indicating body 600 is in contact with the projection screen PS, that is, the projection screen surface SS. For example, infrared light can be used as the layered detection light LL. Here, the "layered" or the "curtain-like" means a thin spatial shape having a substantially uniform thickness. A distance between the projection screen surface SS and the layered detection light LL is set in a range of, for example, 1 to 10 mm, and is preferably set in a range of 1 to 5 mm.

The camera 421 has at least a first image capturing function that receives light of a wavelength region including wavelengths of the layered detection light LL that is infrared light and the infrared light emitted from the spontaneous light emission indicating body 500 and captures an image. The camera 421 further has a second image capturing function that receives light including visible light and captures an image. It is preferable that the camera 421 is configured to be able to switch the two image capturing functions. It is preferable that the camera 421 includes a near-infrared filter switching mechanism (not shown in the drawings) that can arrange a near-infrared filter that blocks visible light and transmits only near-infrared light in front of a lens and can move the near-infrared filter back from in front of the lens. As shown in FIG. 10, the camera 421 is installed at a position away from the projection screen surface SS in the Z direction by a distance L.

The example of FIG. 9 shows a situation where the electronic device 1 operates in a white board mode. The white board mode is a mode where a user can arbitrarily perform drawing on the projection screen PS by using the spontaneous light emission indicating body 500 and the non-light-emission indicating body 600. The projection screen PS including a toolbox TB is projected on the projection screen surface SS. The toolbox TB includes an undo button UDB for undoing processing, a pointer button PTB for selecting a mouse pointer, a pen button PEB for selecting a drawing pen tool, an eraser button ERB for selecting an eraser tool for erasing a drawn image, and a forward/reverse button FRB for forwarding or reversing the screen. When the user clicks one of the buttons by using the indicating body, the user can perform processing corresponding to the button or select a tool corresponding to the button. Immediately after the start-up of the electronic device 1, the mouse pointer may be selected as a default tool. In the example of FIG. 9, a situation is shown where after selecting the pen tool, the user moves the spontaneous light emission indicating body 500 in the projection screen PS while the tip portion 501 of the spontaneous light emission indicating body 500 is in contact with the projection screen surface SS and thereby a line is being drawn in the projection screen PS. The line is drawn by a projection image generation unit, which will be described later, in the interactive projector 400.

The electronic device 1 can operate in a mode other than the white board mode. For example, the electronic device 1 can operate in a PC interactive mode where an image of data transferred from a personal computer not shown in the drawings through a communication line is displayed on the projection screen PS. In the PC interactive mode, for example, an image of data of spreadsheet software or the like is displayed, and data can be inputted, created, and modified by using various tools and icons displayed in the image. The electronic device 1 can operate in a projection mode where an image is only displayed on the projection screen PS and the spontaneous light emission indicating body 500 is not used.

Figure 11:
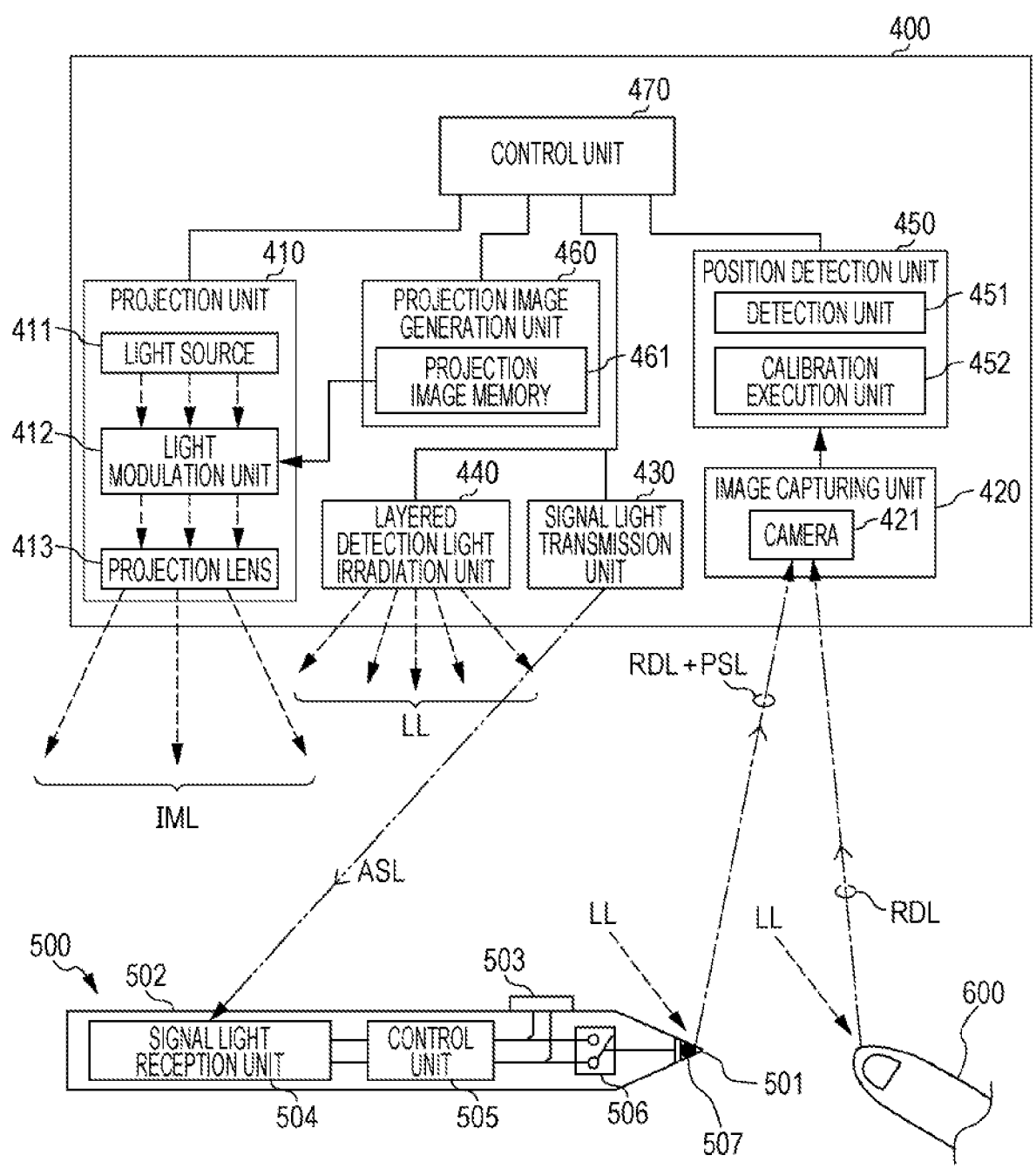
FIG. 11 is a block diagram showing an internal configuration of an interactive projector and a spontaneous light emission indicating body.

FIG. 11 is a block diagram showing an internal configuration of the interactive projector 400 and the spontaneous light emission indicating body 500. The interactive projector 400 has a projection unit 410, an image capturing unit 420, a signal light transmission unit 430, the layered detection light irradiation unit 440, a position detection unit 450, a projection image generation unit 460, and a control unit 470.

The control unit 470 performs control of each unit in the interactive projector 400. The control unit 470 determines content of an instruction issued on the projection screen PS according to an indicated position of the spontaneous light emission indicating body 500 and/or the non-light-emission indicating body 600 detected by the position detection unit 450 and instructs the projection image generation unit 460 to create or change a projection image according to the content of the instruction.

The projection image generation unit 460 has a projection image memory 461 that stores a projection image and has a function to generate a projection image to be projected on the projection screen surface SS by the projection unit 410. It is preferable that the projection image generation unit 460 further has a function as a keystone correction unit that corrects a trapezoidal distortion of the projection screen PS.

The projection unit 410 has a function to project a projection image generated by the projection image generation unit 460 on the projection screen surface SS. The projection unit 410 has a light source 411 and a light modulation unit 412 in addition to the projection lens 413 described in FIG. 10. The light modulation unit 412 forms projection image light IML by modulating light from the light source 411 according to projection image data given from the projection image memory 461. The projection image light IML is typically color image light including visible light of RGB three colors and is projected on the projection screen surface SS by the projection lens 413. As the light source 411, it is possible to employ various light sources such as a light-emitting diode and a laser diode in addition to a light source lamp such as an ultra-high pressure mercury lamp. As the light modulation unit 412, it is possible to employ a transmission type or reflection type liquid crystal panel, a digital mirror device, and the like. A plurality of light modulation units 412 may be used for each color light.

The signal light transmission unit 430 has a function to transmit apparatus signal light ASL received by the spontaneous light emission indicating body 500. The apparatus signal light ASL is a near infrared light signal for synchronization and is periodically emitted from the signal light transmission unit 430 of the interactive projector 400 to the spontaneous light emission indicating body 500. A tip light-emitting unit 507 of the spontaneous light emission indicating body 500 emits indicating body signal light PSL that is near infrared light having a predetermined light emission pattern. When the camera 421 of the image capturing unit 420 detects positions of the spontaneous light emission indicating body 500 and the non-light-emission indicating body 600, the camera 421 performs image capturing at a predetermined timing synchronized with the apparatus signal light ASL.

The image capturing unit 420 has the camera 421 described in FIGS. 9 and 10. As described above, the camera 421 has a function that receives light of a wavelength region including wavelengths of the layered detection light LL and the infrared light emitted from the spontaneous light emission indicating body 500 and captures an image. In the example of FIG. 11, a situation is shown where the layered detection light LL irradiated from the layered detection light irradiation unit 440 is reflected by the spontaneous light emission indicating body 500 and the non-light-emission indicating body 600 and reflected detection light RDL of the layered detection light LL is received by the camera 421 and an image is captured. Furthermore, the camera 421 receives the indicating body signal light PSL emitted from the tip light-emitting unit 507 of the spontaneous light emission indicating body 500 and captures an image. The image capturing of the camera 421 is performed in both a first period of time in which the layered detection light LL emitted from the layered detection light irradiation unit 440 is in a light emitting state and a second period of time in which the layered detection light LL is in a non-light-emitting state. By comparing images in the two types of periods of time, the position detection unit 450 can determine whether each indicating body included in the images is the spontaneous light emission indicating body 500 or the non-light-emission indicating body 600.

The position detection unit 450 has a function to determine an indicated position of the spontaneous light emission indicating body 500 or the non-light-emission indicating body 600 by analyzing an image captured by the camera 421. In this case, the position detection unit 450 determines whether each indicating body in the image is the spontaneous light emission indicating body 500 or the non-light-emission indicating body 600 by using the light emission pattern of the spontaneous light emission indicating body 500. In the present embodiment, the position detection unit 450 includes a detection unit 451 and a calibration execution unit 452. The detection unit 451 has a function to detect an indicated position of the indicating body by analyzing a captured image that is captured by the camera 421. The calibration execution unit 452 has a function to perform an automatic calibration, that is, a function to make correspondence between positions on the captured image and positions on image data in the projection image memory 461. A result of the automatic calibration is used when the detection unit 451 detects the indicated position of the indicating body. Specifically, as shown in FIG. 9, when an indication is performed by using the spontaneous light emission indicating body 500, the detection unit 451 detects an indicated position that is indicated by the spontaneous light emission indicating body 500 based on a captured image including the spontaneous light emission indicating body 500 captured by the camera 421 of the image capturing unit 420 by using a correspondence relationship of positions determined by the automatic calibration. As a result of the automatic calibration, a correspondence relationship between the positions on the captured image and the positions on the image data in the projection image memory 461 is determined. The correspondence relationship corresponds to a correspondence relationship between positions on the projection screen surface SS and coordinates of the interactive projector 400.

The spontaneous light emission indicating body 500 is provided with a signal light reception unit 504, a control unit 505, a tip switch 506, and a tip light-emitting unit 507 in addition to the button switch 503. The signal light reception unit 504 has a function to receive the apparatus signal light ASL emitted from the signal light transmission unit 430 of the interactive projector 400. The tip switch 506 is a switch that becomes on state when the tip portion 501 of the spontaneous light emission indicating body 500 is pressed and becomes off state when the tip portion 501 is released.

The tip switch 506 is normally in the off state, and when the tip portion 501 of the spontaneous light emission indicating body 500 comes into contact with the projection screen surface SS, the tip switch 506 becomes the on state by contact pressure of the tip portion 501. When the tip switch 506 is in the off state, the control unit 505 causes the tip light-emitting unit 507 to emit light with a specific first light emission pattern indicating that the tip switch 506 is in the off state and thereby emits the indicating body signal light PSL having the first light emission pattern. On the other hand, when the tip switch 506 becomes the on state, the control unit 505 causes the tip light-emitting unit 507 to emit light with a specific second light emission pattern indicating that the tip switch 506 is in the on state and thereby emits the indicating body signal light PSL having the second light emission pattern. The first light emission pattern and the second light emission pattern are different from each other, so that the position detection unit 450 can identify whether the tip switch 506 is in the on state or in the off state by analyzing an image captured by the camera 421.

The button switch 503 of the spontaneous light emission indicating body 500 has the same function as that of the tip switch 506. Therefore, the control unit 505 causes the tip light-emitting unit 507 to emit light with the second light emission pattern when the button switch 503 is pressed by a user and causes the tip light-emitting unit 507 to emit light with the first light emission pattern when the button switch 503 is not pressed. In other words, the control unit 505 causes the tip light-emitting unit 507 to emit light with the second light emission pattern when at least one of the tip switch 506 and the button switch 503 is in the on state and causes the tip light-emitting unit 507 to emit light with the first light emission pattern when both the tip switch 506 and the button switch 503 are in the off state.

However, the button switch 503 may be assigned with a function different from that of the tip switch 506. For example, if the button switch 503 is assigned with the same function as that of a mouse right click button, when a user presses the button switch 503, an instruction of right click is transmitted to the control unit 470 of the interactive projector 400 and processing according to the instruction is performed. In this way, when the button switch 503 is assigned with a function different from that of the tip switch 506, the tip light-emitting unit 507 emits light with four light emission patterns different from each other according to the on/off states of the tip switch 506 and the on/off states of the button switch 503. In this case, the spontaneous light emission indicating body 500 can transmit four combinations of the on/off states of the tip switch 506 and the button switch 503 to the interactive projector 400 while differentiating the four combinations.

Figure 12:
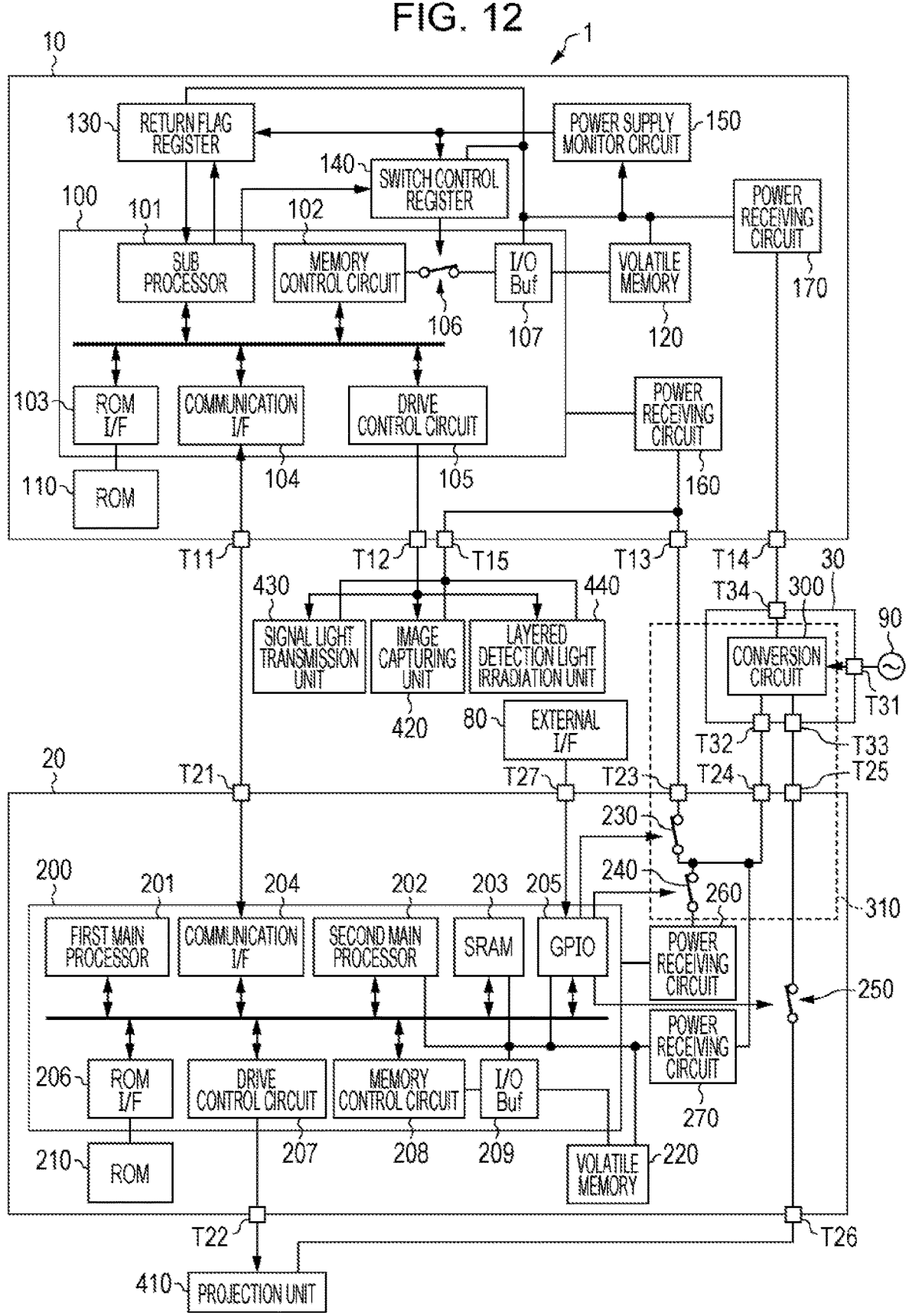
FIG. 12 is a diagram showing a functional configuration of the electronic device of the second embodiment.

FIG. 12 is a diagram showing a functional configuration of the electronic device 1 of the second embodiment. As shown in FIG. 12, the configuration of the interactive projector 400 shown in FIG. 11 is realized by using the main circuit and the sub circuit in the same manner as in the first embodiment. In FIG. 12, the same circuits as those in FIG. 3 are given the same reference numerals and their description will be omitted. However, the main circuit 200 and the sub circuit 100 are different from those in FIG. 3, which realize a function of a complex machine, in that the main circuit 200 and the sub circuit 100 function so as to realize an interactive projection system. For example, in the example of FIG. 12, the main circuit 200 functions as the projection image generation unit 460 and a part of the control unit 470 in FIG. 11, and the sub circuit 100 functions as the position detection unit 450 and a part of the control unit 470 in FIG. 11.

For example, the sub circuit 100 is in the normal operation state, where electric power is supplied from the power supply circuit 310, in the white board mode and the PC interactive mode, and is in the sleep state, where electric power is not supplied from the power supply circuit 310, in the projection mode where the spontaneous light emission indicating body 500 is not used. The main circuit 200 is in the normal operation state in any of the projection mode, the white board mode, and the PC interactive mode. The operation where the sub circuit transits from the normal operation state to the sleep state and the operation where the sub circuit 100 transits from the sleep state to the normal operation state are the same as those in the first embodiment, so their description will be omitted.

The electronic device 1 of the second embodiment described above achieves the same effects as those of the electronic device 1 of the first embodiment.

3. Modified Examples

As the electronic device of the present disclosure, the complex machine is described in the first embodiment, and the interactive projection system is described in the second embodiment. However, the present disclosure can be applied to various electronic devices other than those described above. Examples of the electronic device where the present disclosure can be applied include a mobile, laptop, or a tablet type personal computer, a mobile terminal such as a smartphone and a cellular phone handset, a digital camera, an ink jet discharge apparatus such as an ink jet printer, a storage area network device such as a router and a switch, a local area network device, a mobile terminal base station device, a television set, a video camera, a video recorder, a car navigation apparatus, a real time clock apparatus, a pager, an electronic notebook, an electronic dictionary, an electronic calculator, an electronic game device, a game controller, a word processor, a work station, a video telephone, a security television monitor, an electronic binocular telescope, a POS terminal, a medical device such as an electronic thermometer, a blood pressure meter, a blood sugar meter, an electrocardiographic apparatus, an ultrasonic diagnostic apparatus, and an electronic endoscope, a fish detector, various measuring apparatuses, instruments of a vehicle, an airplane, and a ship, a flight simulator, a head mount display, a motion tracer, a motion tracker, a motion controller, and a pedestrian dead reckoning (PDR) apparatus.

While the embodiments and the modified examples have been described, the disclosure is not limited to the embodiments and the modified examples, but can be implemented in various ways without departing from the scope of the disclosure. For example, the embodiments and the modified examples described above can be arbitrarily combined.

For example, the present disclosure includes substantially the same configuration as that described in the embodiments (for example, a configuration having the same functions, methods, and results, or a configuration having the same object and effects). Further, the present disclosure includes a configuration in which non-essential portions of the configurations described in the embodiments are replaced. Further, the present disclosure includes a configuration that achieves the same operational effects or can achieve the same objects as those of the configurations described in the embodiments. Further, the present disclosure includes a configuration in which a known technique is added to the configurations described in the embodiments.

What is claimed is:

1. An electronic device comprising:
   a main circuit including a processor;
   a sub circuit that transits between a plurality of states including a first state and a second state where power consumption is smaller than that in the first state; and
   a power supply circuit that supplies electric power to the main circuit and the sub circuit, wherein
   an electrical distance between the main circuit and the power supply circuit is shorter than an electrical distance between the main circuit and the sub circuit,
   the processor determines whether or not to cause the sub circuit to transit from the second state to the first state, and when determining to cause the sub circuit to transit, the processor increases electric power supplied from the power supply circuit to the sub circuit, and
   the sub circuit transits from the second state to the first state in response to increase of the electric power supplied from the power supply circuit.

2. The electronic device according to claim 1, wherein the sub circuit does not issue an instruction to the power supply circuit.

3. The electronic device according to claim 1, wherein the main circuit does not issue an instruction to the sub circuit to transit from the second state to the first state.

4. The electronic device according to claim 1, wherein the processor is a main processor, and
   the sub circuit has a sub processor.

5. The electronic device according to claim 1, wherein the power supply circuit converts an AC voltage supplied from a commercial power supply into an DC voltage and supplies electric power based on the DC voltage to the main circuit and the sub circuit.

6. The electronic device according to claim 1, wherein when the sub circuit is in the second state, a supply line that supplies electric power from the power supply circuit to the sub circuit when the sub circuit is in the first state is disconnected.

7. The electronic device according to claim 1, further comprising:
   an external interface unit that receives an instruction from outside the electronic device, wherein
   the processor determines whether or not to cause the sub circuit to transit from the second state to the first state based on an instruction received from the external interface unit.

8. The electronic device according to claim 1, wherein an electrical distance between the main circuit and the power supply circuit is 30 cm or less, and
   an electrical distance between the main circuit and the sub circuit is 80 cm or more.

9. The electronic device according to claim 1, further comprising:
   a register that stores a return flag, wherein
   the sub circuit starts a first operation when the return flag has a first value and starts a second operation different from the first operation when the return flag has a second value.

10. The electronic device according to claim 9, further comprising:
    a volatile memory; and
    a power supply monitor circuit that switches the return flag from the second value to the first value when electric power supplied to the volatile memory becomes less than a threshold value.

11. The electronic device according to claim 10, wherein
when the sub circuit receives an instruction to transit to the second state from the main circuit, the sub circuit protects data of the volatile memory and transits to the second state, and the sub circuit uses the protected data of the volatile memory after transiting from the second state to the first state.

12. The electronic device according to claim 11, wherein the sub circuit protects the data of the volatile memory by switching the volatile memory to a self-refresh mode.

13. The electronic device according to claim 1, further comprising:

a first circuit substrate;
a second circuit substrate; and
a third circuit substrate, wherein
the main circuit is provided on the first circuit substrate,
the sub circuit is provided on the second circuit substrate, and
the power supply circuit includes
a switch which is provided on the first circuit substrate and is switched by the main circuit, and
a conversion circuit which is provided on the third circuit substrate and performs voltage conversion, and
supplies electric power based on a voltage converted by the conversion circuit to the sub circuit through the switch.

14. An electronic device comprising:
a main circuit including a processor;
a sub circuit that transits between a plurality of states including a first state and a second state where power consumption is smaller than that in the first state; and
a relay circuit, wherein
an electrical distance between the main circuit and the relay circuit is shorter than an electrical distance between the main circuit and the sub circuit,
the processor determines whether or not to cause the sub circuit to transit to the second state, and when determining to cause the sub circuit to transit, the processor issues a first instruction to the sub circuit without controlling the relay circuit,
the sub circuit transits to the second state when receiving the first instruction, the processor determines whether or not to cause the sub circuit to transit from the second state to the first state, and when determining to cause the sub circuit to transit, the processor issues a second instruction to the relay circuit,
the relay circuit closes when receiving the second instruction, and
the sub circuit transits from the second state to the first state in response to a fact that the relay circuit was closed.

15. The electronic device according to claim 14, wherein the processor issues the first instruction to the sub circuit through a cable.

16. The electronic device according to claim 15, wherein the sub circuit transits from the first state to the second state according to the first instruction.

17. The electronic device according to claim 14, wherein the main circuit has a main processor, and
the sub circuit has a sub processor.

18. The electronic device according to claim 2, wherein an electrical distance between the main circuit and the relay circuit is 30 cm or less, and
an electrical distance between the main circuit and the sub circuit is 80 cm or more.

19. A circuit substrate comprising:
a power receiving circuit that receives electric power from a power supply circuit that supplies electric power to a main circuit;
a sub circuit that operates based on the electric power received by the power receiving circuit; and
a connector to which a cable coupled to the main circuit is coupled, wherein
the sub circuit transits between a plurality of states including a first state and a second state where power consumption is smaller than that in the first state, and
the sub circuit performs an operation based on an instruction received from the main circuit through the connector in the first state, and transits from the second state to the first state without receiving an instruction from the main circuit through the connector in the second state.

20. The circuit substrate according to claim 19, further comprising:
a register that stores a return flag, wherein
the sub circuit starts a first operation when the return flag has a first value and starts a second operation different from the first operation when the return flag has a second value.

* * * * *